(12) United States Patent
Kwak et al.

(10) Patent No.: US 11,790,820 B2
(45) Date of Patent: Oct. 17, 2023

(54) ELECTRONIC DEVICE INCLUDING ROLLABLE DISPLAY ROLLED INTO CIRCLE

(71) Applicant: Samsung Electronics Co., Ltd., Suwon-si (KR)

(72) Inventors: Myunghoon Kwak, Suwon-si (KR); Songyi Lee, Suwon-si (KR); Junyoung Choi, Suwon-si (KR); Yangwook Kim, Suwon-si (KR); Yangsoo Choi, Suwon-si (KR); Hyunju Hong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/837,538

(22) Filed: Jun. 10, 2022

(65) Prior Publication Data
US 2022/0398958 A1    Dec. 15, 2022

Related U.S. Application Data

(63) Continuation of application No. PCT/KR2022/008024, filed on Jun. 7, 2022.

(30) Foreign Application Priority Data

Jun. 14, 2021    (KR) .......................... 10-2021-0076817

(51) Int. Cl.
   *G09G 3/00*        (2006.01)
   *G06F 3/01*        (2006.01)
   (Continued)

(52) U.S. Cl.
   CPC ........... *G09G 3/035* (2020.08); *G06F 1/1652* (2013.01); *G06F 3/011* (2013.01);
   (Continued)

(58) Field of Classification Search
   CPC .... G06F 1/1652; G06F 1/1677; G06F 1/3231; G06F 1/3265; G06F 2203/04803;
   (Continued)

(56) References Cited

U.S. PATENT DOCUMENTS

| | | |
|---|---|---|
| 9,098,241 B1 | 8/2015 | Cho et al. |
| 10,128,458 B2 | 11/2018 | Lee |

(Continued)

FOREIGN PATENT DOCUMENTS

| | | |
|---|---|---|
| JP | 2015-109516 A | 6/2015 |
| KR | 10-2016-0011718 A | 2/2016 |

(Continued)

OTHER PUBLICATIONS

International Search Report dated Sep. 8, 2022, issued in an International Application No. PCT/KR2022/008024.

*Primary Examiner* — Richard J Hong
(74) *Attorney, Agent, or Firm* — Jefferson IP Law, LLP

(57) ABSTRACT

An electronic device including a rollable display is provided. The electronic device includes a housing including a main body, a first planar part disposed at one end of the main body, and a second planar part disposed at another end of the main body and disposed in parallel to the first planar part, a rollable display drawn out from an interior of the housing or inserted into the interior of the housing through a slit formed in a direction perpendicular to the first planar part, and a handler member combined with an end of the rollable display and including a first magnet. A second magnet having a polarity different from a polarity of the first magnet disposed within the main body so that the handler member is attached to a surface of the main body in a state in which a part of the rollable display has been drawn out from the interior of the housing.

21 Claims, 32 Drawing Sheets

(51) Int. Cl.
*G06T 7/20* (2017.01)
*G06T 7/70* (2017.01)
*G06F 1/16* (2006.01)
*G06F 3/04886* (2022.01)

(52) U.S. Cl.
CPC ............ *G06F 3/04886* (2013.01); *G06T 7/20* (2013.01); *G06T 7/70* (2017.01); *G06T 2207/30196* (2013.01); *G06T 2207/30242* (2013.01); *G09G 2354/00* (2013.01)

(58) Field of Classification Search
CPC .... G06F 3/011; G06F 3/0488; G06F 3/04886; G06F 3/0482; G06F 3/0418; G06F 1/1626; G06F 3/0304; G06F 1/1643; G06F 1/1656; G06T 2207/30196; G06T 2207/30242; G06T 7/20; G06T 7/70; G09G 2354/00; G09G 3/035; H10K 50/84; G02B 30/35

See application file for complete search history.

(56) References Cited

U.S. PATENT DOCUMENTS

| | | | |
|---|---|---|---|
| 10,345,992 B2 | 7/2019 | Hwang et al. | |
| 2010/0117975 A1* | 5/2010 | Cho | G06F 3/0418 |
| | | | 345/173 |
| 2012/0274583 A1* | 11/2012 | Haggerty | G06F 3/0488 |
| | | | 345/173 |
| 2013/0134929 A1 | 5/2013 | Alberth | |
| 2014/0002419 A1* | 1/2014 | Thorson | G06F 1/1626 |
| | | | 345/175 |
| 2015/0220119 A1 | 8/2015 | Seo et al. | |
| 2016/0187929 A1* | 6/2016 | Kim | G06F 1/1643 |
| | | | 345/184 |
| 2016/0209879 A1* | 7/2016 | Ryu | G06F 1/1652 |
| 2017/0325342 A1* | 11/2017 | Lee | H10K 50/84 |
| 2019/0384438 A1* | 12/2019 | Park | G06F 3/0482 |
| 2020/0402434 A1* | 12/2020 | Yamazuki | G06F 1/1626 |
| 2021/0116798 A1* | 4/2021 | Nakamura | G02B 30/35 |
| 2022/0011853 A1* | 1/2022 | Shimizu | G06F 3/0304 |
| 2022/0253104 A1* | 8/2022 | Luo | G06F 1/1652 |
| 2023/0004189 A1* | 1/2023 | Luo | G06F 1/1656 |

FOREIGN PATENT DOCUMENTS

| | | | | |
|---|---|---|---|---|
| KR | 10-2017-0081345 A | 7/2017 | | |
| KR | 10-2017-0126069 A | 11/2017 | | |
| KR | 10-2018-0090627 A | 8/2018 | | |
| KR | 10-1892959 B1 | 8/2018 | | |
| KR | 10-2008916 B1 | 8/2019 | | |
| KR | 2019114573 A | * 10/2019 | ............ | G06F 3/005 |
| KR | 10-2021-0020972 A | 2/2021 | | |

* cited by examiner

∴ S2 > S1

∴ S3 > S2

FIG. 24
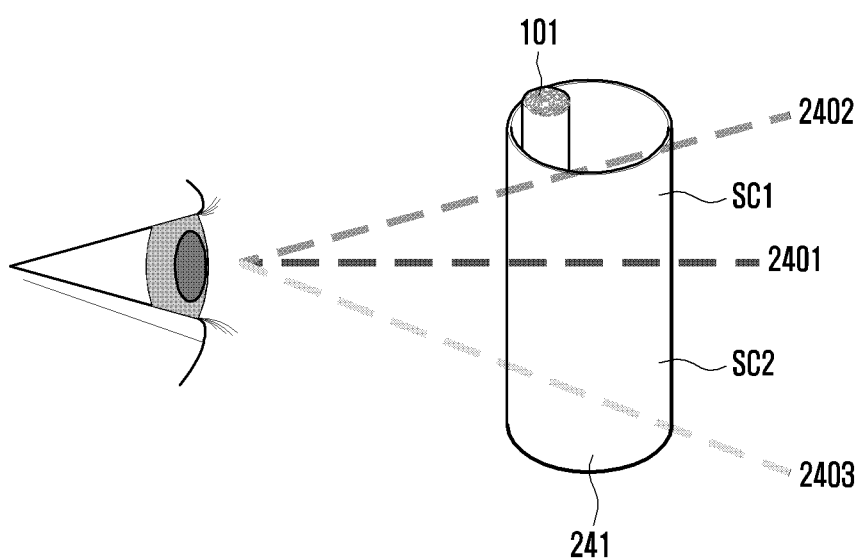
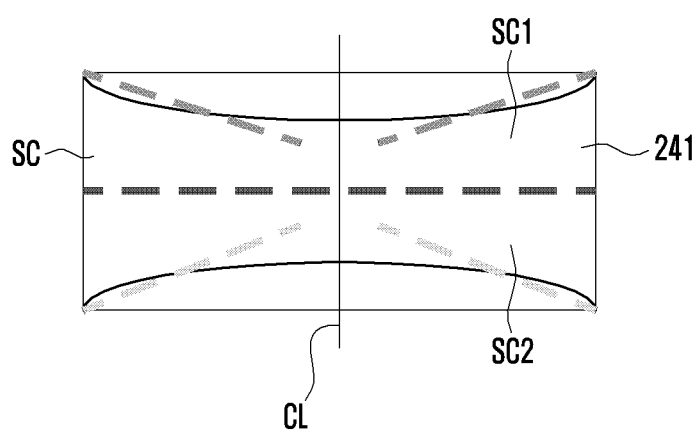

FIG. 25
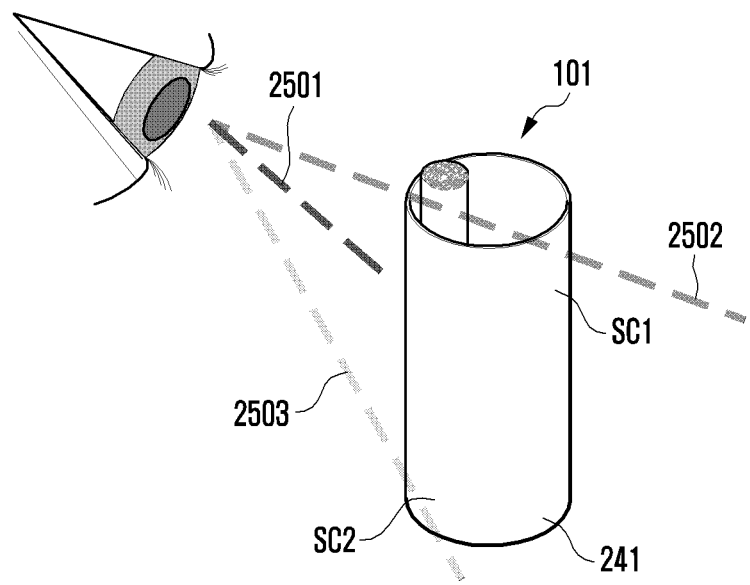
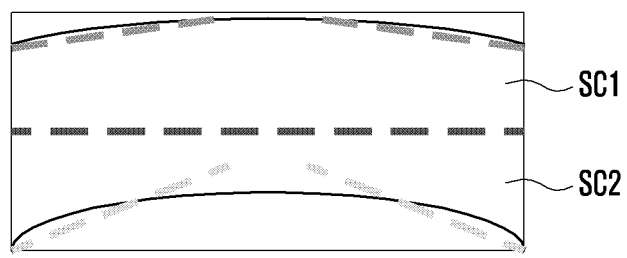

ELECTRONIC DEVICE INCLUDING ROLLABLE DISPLAY ROLLED INTO CIRCLE

CROSS-REFERENCE TO RELATED APPLICATION(S)

This application is a continuation application, claiming priority under § 365(c), of an International application No. PCT/KR2022/008024, filed on Jun. 7, 2022, which is based on and claims the benefit of a Korean patent application number 10-2021-0076817, filed on Jun. 14, 2021, in the Korean Intellectual Property Office, the disclosure of which is incorporated by reference herein in its entirety.

TECHNICAL FIELD

The disclosure relates to an electronic device including a rollable display.

BACKGROUND ART

As the display technology develops, the research and development of an electronic device including a rollable display (or a flexible display) are actively carried out.

A shape of the electronic device deviates from a uniform rectangular shape and gradually changes into various forms. For example, a display of the electronic device is researched and developed to have a form factor which can be folded, bent, rolled or unfolded by applying a rollable display.

The above information is presented as background information only to assist with an understanding of the disclosure. No determination has been made, and no assertion is made, as to whether any of the above might be applicable as prior art with regard to the disclosure.

Technical Problem

An electronic device may be designed so that a rollable display within a housing of the electronic device is wound as a new form factor. Such an electronic device may be designed so that a rollable display of the electronic device is drawn out from the interior of a housing to the outside based on a designated event.

Aspects of the disclosure are to address at least the above-mentioned problems and/or disadvantages and to provide at least the advantages described below. Accordingly, an aspect of the disclosure is to provide an electronic device including a housing and a new form factor in which a rollable display may be designed to be drawn out from the interior of the housing and an end portion of the drawn rollable display is attached to a surface of the housing, thus providing a cylindrical display area.

Another aspect of the disclosure is to provide an electronic device and method providing various user interfaces or user experiences in the state in which a cylindrical display area is provided by attaching an end portion of a drawn rollable display to a surface of a housing.

Additional aspects will be set forth in part in the description which follows and, in part, will be apparent from the description, or may be learned by practice of the presented embodiments.

Solution to Problem

In accordance with an aspect of the disclosure, an electronic device is provided. The electronic device includes a housing including a main body, a first planar part disposed at one end of the main body, and a second planar part disposed at another end of the main body and disposed in parallel to the first planar part, a rollable display drawn out from an interior of the housing or inserted into the interior of the housing through a slit of the main body formed in a direction perpendicular to the first planar part, and a handler member combined with an end of the rollable display and including at least one first magnet. At least one second magnet having a polarity different from a polarity of the first magnet may be disposed within the main body so that the handler member is attached to a surface of the main body in a state in which at least a part of the rollable display has been drawn out from the interior of the housing.

Advantageous Effects of Invention

The electronic device according to various embodiments of the disclosure enables a user to experience a new life style using the electronic device and can improve convenience because the electronic device provides a new form factor which can be designed to have a rollable display thereof drawn out from the interior of a housing and can provide a cylindrical display area because an end portion of the drawn rollable display is attached to a surface of the housing.

The electronic device and method according to various embodiments of the disclosure can provide various user interfaces or user experiences in the state in which a cylindrical display area is provided because an end portion of a drawn rollable display is attached to a surface of a housing.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which:

FIG. 24 is an example describing an operation of correcting, by the electronic device, the distortion of a screen displayed on the rollable display based on a visual axis of a user being detected according to an embodiment of the disclosure;

FIG. 25 is another example describing an operation of correcting, by the electronic device, the distortion of a screen displayed on the rollable display based on a visual axis of a user being detected according to an embodiment of the disclosure;

Throughout the drawings, like reference numerals will be understood to refer to like parts, components, and structures.

MODE FOR THE INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
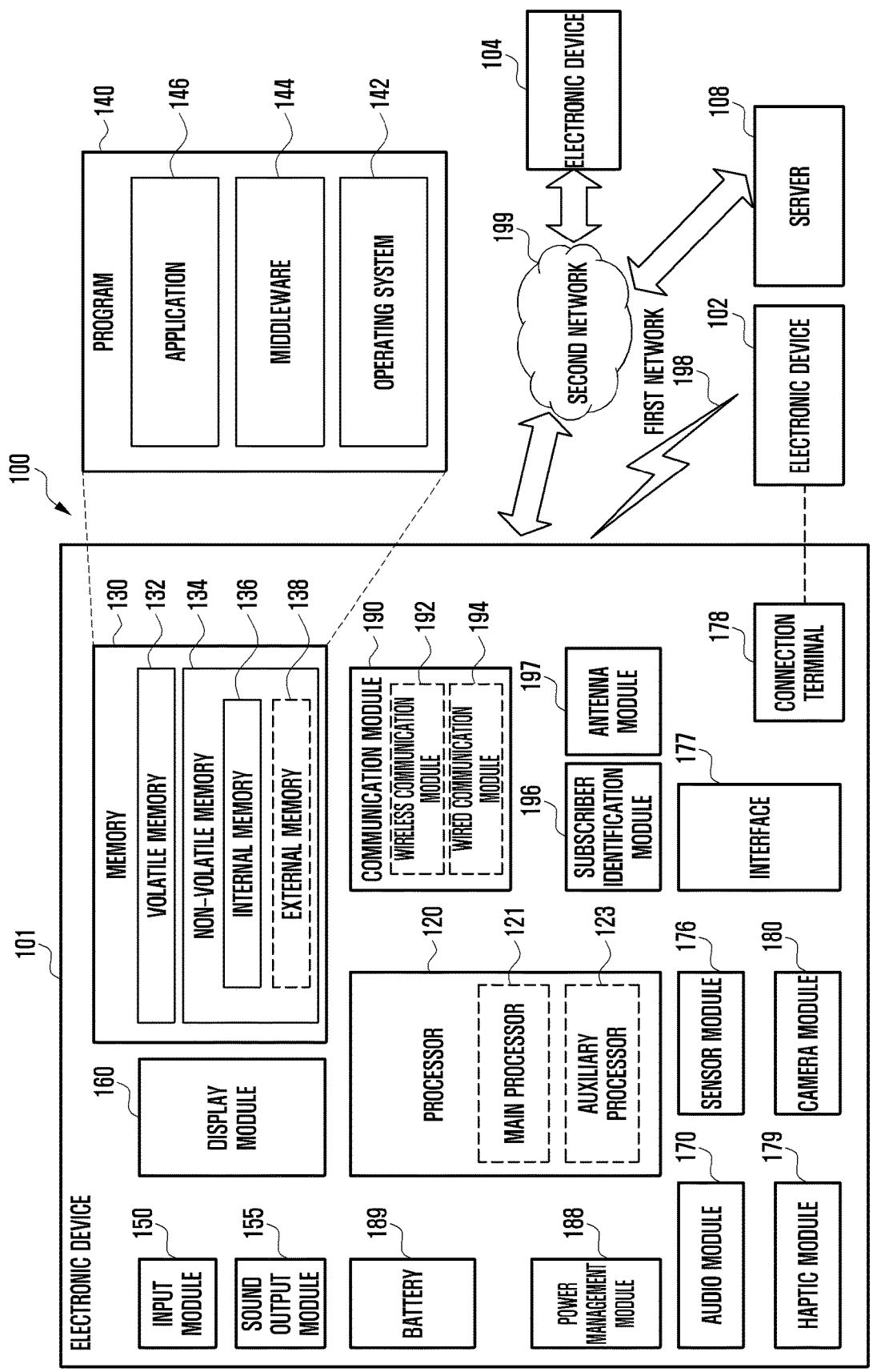
FIG. 1 block diagram of an electronic device within a network environment according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5th generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4th generation 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smailphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 3:
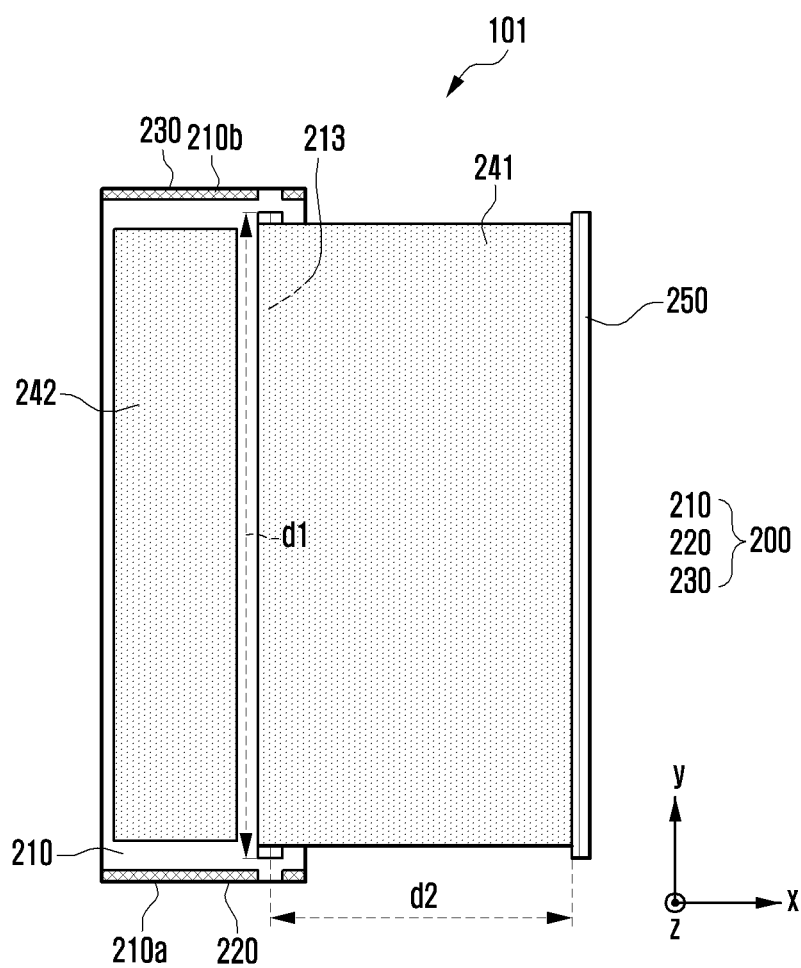
FIG. 3 is a plan view illustrating a front surface of the electronic device in a second state (e.g., a slide-out state) of the electronic device according to an embodiment of the disclosure.
Figure 4:
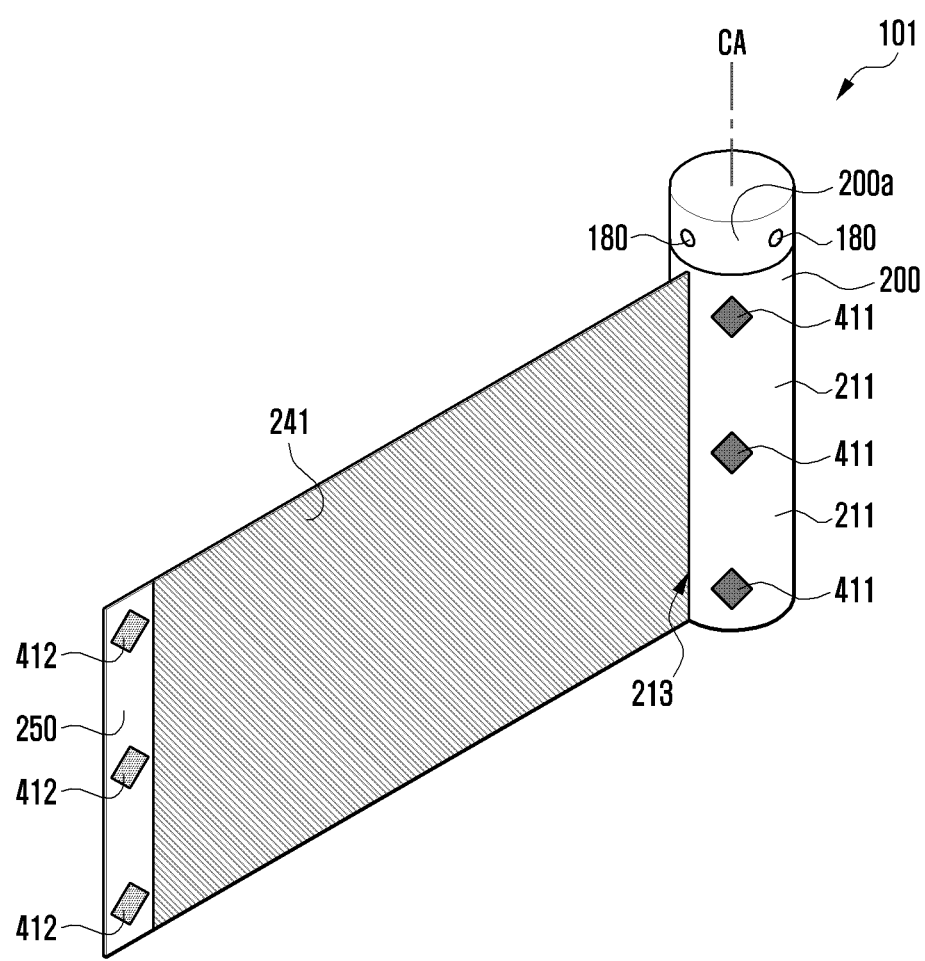
FIG. 4 is a perspective view of the electronic device for describing a method of changing, by the electronic device, a state thereof into a circle mode by using a magnet according to an embodiment of the disclosure.

An electronic device (e.g., the electronic device 101 in FIG. 1) according to various embodiments may include a housing (e.g., a housing 200 in FIG. 2) including a main body (e.g., a main body 210 in FIG. 2), a first planar part (e.g., a first planar part 220 in FIG. 2) disposed at one end of the main body 210 and a second planar part (e.g., a second planar part 230 in FIG. 2) disposed at the other end of the main body 210 and disposed in parallel to the first planar part 220, a rollable display (e.g., a rollable display 241 in FIG. 3) drawn out from the interior of the housing 200 or inserted into the interior of the housing 200 through a slit (e.g., a slit 213 in FIG. 2) of the main body 210 formed in a direction perpendicular to the first planar part, and a handler member (e.g., a handler member 250 in FIG. 3) combined with the end of the rollable display 241 and including at least one first magnet (e.g., a first magnet 411 in FIG. 4). At least one second magnet (e.g., a second magnet 412 in FIG. 4) having a polarity different from a polarity of the first magnet 411 may be disposed within the main body 210 so that the handler member 250 is attached to a surface of the main body 210 in the state in which at least a part of the rollable display 241 has been drawn out from the interior of the housing 200.

According to an embodiment, at least one hall sensor area (e.g., a hall sensor area 511 in FIG. 5) disposed to face the at least one second magnet 412 may be defined in a side part (e.g., a side part 211 in FIG. 2) of the main body 210. A sensor for detecting the state in which the handler member 250 is attached to the hall sensor area 511 based on the first magnet 411 and the second magnet 412 being coupled may be disposed in the hall sensor area 511.

According to an embodiment, the second magnet 412 may not be disposed within the main body 210. In this case, a magnetic body of a metal material may be disposed in a part of the main body 210 so that the magnetic body is combined with the first magnet 411.

According to an embodiment, the electronic device may further include a processor (e.g., the processor 120 in FIG. 1) disposed within the housing 200. The processor 120 may control the rollable display 241 in a circle mode based on the handler member 250 being detected as being attached to the hall sensor area 511 through the sensor.

According to an embodiment, the processor 120 may drive the rollable display 241 to wind at least a part of the side part 211 by drawing out the rollable display 241 through the slit 213 or inserting the rollable display 241 through the slit 213 in the circle mode.

According to an embodiment, at least one camera module 180 is disposed in a part of the housing 200 in a way to be capable of photographing in a 360-degree direction from the electronic device 101. The processor 120 may detect a location of a user and a movement of the user by using the camera module 180.

According to an embodiment, the processor 120 may check the number of users located around the electronic device 101, may divide a display area of the rollable display 241 into a plurality of division areas in a way to correspond to the number of checked users, and may control the plurality of division areas to display different screens, in the circle mode.

According to an embodiment, the electronic device may further include a speaker configured to output a sound through the side part 211. The speaker may be disposed to output a sound to an internal space formed as the rollable display 241 winds the side part 211 in the circle mode.

According to an embodiment, the electronic device may further include a holder 1200 including a seated surface (e.g., a seated surface 1210 in FIG. 12) on which the first planar part 220 or the second planar part 230 is seated as the holder (e.g., the holder 1200 in FIG. 12) for holding the electronic device 101. The holder 1200 may include a sound member configured to receive a sound outputted from the speaker and to output the received sound in a lateral direction of the holder 1200.

According to an embodiment, the holder 1200 may include at least one upper hole (e.g., 1241, 1242, 1243, and 1244 in FIG. 12) disposed on the seated surface, at least one side hole (e.g., 1251, 1252, 1235, and 1254 in FIG. 12) disposed on the side of the holder 1200, and at least one duct line (e.g., 1231, 1232, 1233, and 1234 in FIG. 12) interconnecting the upper holes 1241, 1242, 1243, and 1244 and the side holes 1251, 1252, 1235, and 1254, as the sound member.

According to an embodiment, the upper holes 1241, 1242, 1243, and 1244 may include a first upper hole 1241 disposed in a +x direction, a second upper hole 1242 disposed in a −x direction, a third upper hole 1243 disposed in a +z direction, and a fourth upper hole 1244 disposed in a −z direction when the seated surface is viewed from the top. The side holes 1251, 1252, 1235, and 1254 may include a first side hole 1251 disposed in the +x direction, a second side hole 1252 disposed in the −x direction, a third side hole 1253 disposed in the +z direction, and a fourth side hole 1254 disposed in the −z direction when the seated surface is viewed from the top. The duct lines 1231, 1232, 1233, and 1234 may include a first duct line 1231 connecting the first upper hole 1241 and the first side hole 1251, a second duct line 1232 connecting the second upper hole 1242 and the second side hole 1252, a third duct line 1233 connecting the third upper hole 1243 and the third side hole 1253, and a fourth duct line 1234 connecting the fourth upper hole 1244 and the fourth side hole 1254.

According to an embodiment, the holder 1200 may include an amplifier configured to amplify or attenuate a sound introduced into each of the first duct line to the fourth duct line so that the sound may be outputted only in a specific direction from the holder 1200. The holder 1200 may drive the amplifier based on control of the electronic device 101.

According to an embodiment, the processor 120 may dynamically track a movement of a user located around the electronic device 101 by using the camera module 180 or a microphone, may detect a movement of the user in a y direction of the electronic device 101 in the state in which the electronic device 101 displays a screen in an x direction of the electronic device 101, and may change a direction in which the screen is outputted from the x direction to the y direction in response to the detection, in the circle mode.

According to an embodiment, the processor 120 may dynamically track a movement of a user based on at least one of a voice of the user obtained through the microphone or an image corresponding to at least a part of the body of the user obtained through the camera module 180.

According to an embodiment, when the rollable display 241 is disposed to wind at least a part of the side part 211, in the circle mode, the processor 120 may display a first screen through a first half area 2301, that is, a part of a display area of the rollable display 241, may display a second screen through a second half area 2302 of the display area except the first half area 2301, and may change the screen displayed through the first half area 2301 from the first screen to the second screen and change the screen displayed through the second half area 2302 from the second screen to the first screen, based on a touch input of a user through the first half area 2301.

According to an embodiment, in the circle mode, the processor 120 may detect the number of users located around the electronic device 101, may divide the display area by a number corresponding to the number of detected users, and may control the divided display areas to display independent screens.

According to an embodiment, the processor 120 may change the screen being displayed in the first half area 2301 into another screen whenever a touch input of a user is received through the first half area 2301 in the circle mode. The changed screen may be rotationally repeated whenever a plurality of pre-configured screens receives the touch input.

According to an embodiment, the processor 120 may control the rollable display 241 so that a screen previously displayed in the first half area 2301 is displayed in the second half area 2302 in the circle mode, when the screen displayed through the first half area 2301 is changed.

According to an embodiment, the processor 120 may identify one object to be displayed through a display area of the rollable display 241 in the circle mode when the rollable display 241 is disposed to wind at least a part of the side part 211, and may provide a user with a hologram effect for the one object by dividing the display area into a plurality of sub-display areas and controlling the rollable display 241 so that the one object is displayed in each of the plurality of sub-display areas.

According to an embodiment, the processor 120 may receive an event related to at least one application stored in the electronic device 101, may control the rollable display 241 to display content related to the event based on the event being received, and may change a diameter of the rollable display 241 surrounding the side part 211 of the main body 210 based on the amount of the displayed content, in the circle mode.

According to an embodiment, the processor 120 may receive an event related to at least one application stored in the electronic device 101, and may control the rollable display 241 so that an event not checked by a user and most recently received, among the at least one event, is preferentially displayed in the circle mode.

Figure 2:
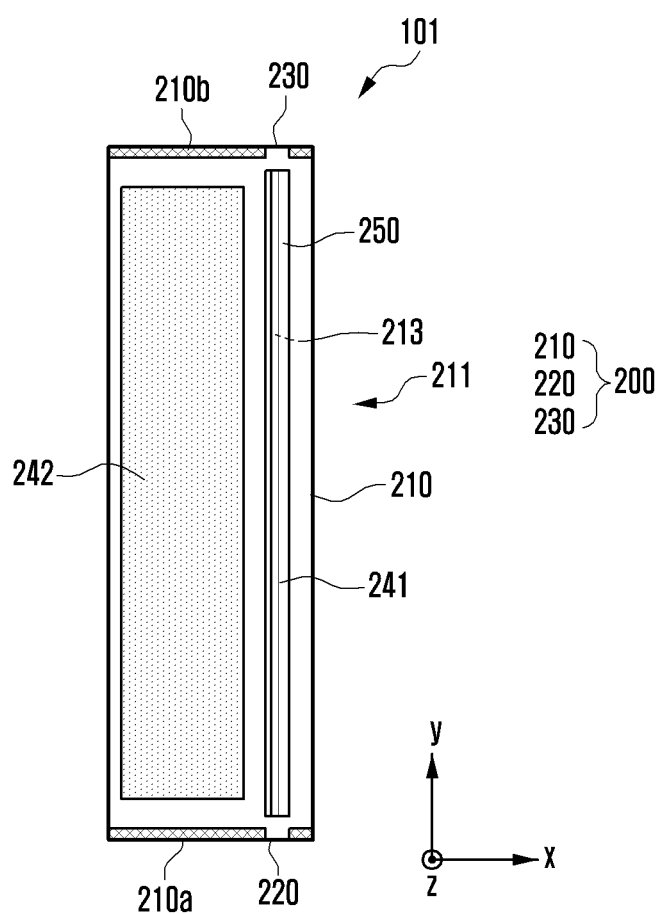
FIG. 2 is a plan view illustrating a front surface of the electronic device in a first state (e.g., a slide-in state) of the electronic device according to an embodiment of the disclosure.

FIG. 2 is a plan view illustrating a front surface of the electronic device 101 in a first state (e.g., a slide-in state) of the electronic device 101 according to an embodiment of the disclosure.

FIG. 3 is a plan view illustrating a front surface of the electronic device 101 in a second state (e.g., a slide-out state) of the electronic device 101 according to an embodiment of the disclosure.

Referring to FIGS. 2 and 3, the electronic device 101 according to various embodiments may include a housing 200.

According to an embodiment, the housing 200 may include a main body 210 having a pole shape, a first planar part 220 disposed at one end 210*a* of the main body 210 and combined with the main body 210 or integratedly formed with the main body 210, and a second planar part 230 disposed at the other end 210*b* of the main body 210 and combined with the main body 210 or integratedly formed with the main body 210.

According to an embodiment, the main body 210 may have a cylindrical shape (e.g., a hollow shape), but a shape of the main body 210 may be variously changed. According to an embodiment, the main body 210 may have a square pillar shape or may have a triangular prism shape. According to an embodiment, the main body 210 may have a square pillar shape, but at least some surface thereof may have a curved surface. According to an embodiment, the main body 210 may have a triangular prism shape, but at least some surface thereof may have a curved surface. The pole shape may mean a shape, including a cylinder, a prism, a square pillar, a triangular prism, etc.

In an embodiment, a shape of the first planar part 220 may be determined based on a shape of the one end 210*a* of the main body 210. For example, if the one end 210*a* of the main body 210 is a circle, the first planar part 220 may be formed as a circle corresponding to the one end 210*a*. In an embodiment, a shape of the second planar part 230 may be determined based on a shape of the other end 210*b* of the main body 210. For example, if the other end 210*b* of the main body 210 is a circle, the second planar part 230 may be formed as a circle corresponding to the other end 210*b*.

According to an embodiment, the first planar part 220 may be extended from the one end 210*a* of the main body 210. According to an embodiment, the second planar part may be extended from the other end 210*b* of the main body 210. According to an embodiment, the first planar part 220 and the second planar part 230 may be disposed substantially in parallel to each other. According to an embodiment, the main body 210 may substantially form a side part 211 of the electronic device 101 because the main body 210 is disposed between the first planar part 220 and the second planar part 230. For example, the main body 210 may form the side part 211 of the electronic device 101 including a curved surface. According to various embodiments, the design of curvature of the main body 210 or the diameter of the main body 210 may be variously changed. Although not illustrated, the main body 210 may have substantially a cylindrical shape, but may include at least partially a flat plane.

According to an embodiment, the electronic device 101 may include a second display 242 exposed to the outside through at least a part of the main body 210 of the housing 200. According to an embodiment, the second display 242 may be fixedly visually exposed on the outside regardless of whether the electronic device 101 has a first state or the electronic device 101 has a second state. For example, the second display 242 may be fixedly visually exposed on the outside by being exposed to the outside through at least some surface of the main body 210.

According to an embodiment, the second display 242 may be disposed in a recess (not illustrated) formed in at least some surface of the main body 210, and may be disposed to occupy some area of the main body 210. According to an embodiment, the second display 242 may include a curved surface having curvature similar to curvature of a surface of the main body 210 as the surface of the main body 210 has a curved surface. In an embodiment, the second display 242 may have a flat shape. In this case, a flat support surface (not illustrated) for supporting the second display 242 may be formed on a surface of the main body 210.

According to another embodiment, the electronic device 101 may not include the second display 242.

According to an embodiment, a slit 213 through which a first display 241 is drawn out from an internal space (not illustrated) of the housing 200 may be formed in the main body 210 of the housing 200. According to an embodiment, the slit 213 may be formed in a first direction (e.g., a y direction) in which the length of the main body 210 is formed, and may have a first length "d1." One end of the first display 241 may be connected to a rotation shaft (not illustrated) disposed in the internal space (not illustrated) of the housing 200, and may slide out from the internal space (not illustrated) of the housing 200 to the outside while operating in conjunction with the rotation of the rotation shaft 811.

According to an embodiment, in the second state of the electronic device 101, the first display 241 may be drawn out from the main body 210 of the housing 200 by a designated second length "d2" in a second direction (e.g., an x direction) perpendicular to a first direction (e.g., the y direction). For example, in the second state of the electronic device 101, the area of a display area of the first display 241 may have a transverse width corresponding to the second length "d2" and a longitudinal width corresponding to the first length "d1."

According to an embodiment, in the second state of the electronic device 101, a part of the first display 241 that is visually displayed on the outside may be supported by a display support structure. According to an embodiment, the display support structure may include a bendable member (or a bendable support member) (e.g., a multi joint hinge module) (not illustrated) and/or a handler member 250 combined with the end of the first display 241 and formed in a first direction (e.g., the y direction).

According to an embodiment, the bendable member may be a part with which a plurality of hinge bars (not illustrated) arranged in a first direction (e.g., the y direction) perpendicular to a second direction (e.g., the x direction) in which the first display 241 slides and moves is combined. The bendable member according to various embodiments may be named a term, such as a multi joint hinge, a multi-bar assembly, or a hinge bar assembly. According to an embodiment, the bendable member may be at least partially inserted into the internal space (not illustrated) of the housing 200 while supporting the first display 241 or may be drawn out from the internal space (not illustrated). In an embodiment, the bendable member may be omitted.

According to an embodiment, the handler member 250 may be combined with the end of the bendable member, and may be disposed in a first direction (e.g., the y direction) that forms the length direction of the main body 210. According to an embodiment, the handler member 250 may perform a role of preventing the first display 241 from being twisted in a z direction or a −z direction in the second state of the electronic device 101. According to an embodiment, the handler member 250 may play a role as a handle by which a user grips a part of the first display 241. According to an embodiment, the handler member 250 may include at least one sensor for detecting the gripping of a user or a state (e.g., a posture or a direction) of the electronic device 101. According to an embodiment, the handler member 250 may further include an antenna or a substrate that is not illustrated.

According to an embodiment, in the first state of the electronic device 101, the first display 241 may slide and move in a third direction (a −x direction) opposite to the second direction (the x direction), and may slide in the internal space (not illustrated) of the housing 200.

According to an embodiment, in the first state of the electronic device 101, at least a part of the first display 241 may be disposed in the state in which the at least a part has been wound on the main body 210 of the housing 200. For example, when the electronic device 101 changes from the second state to the first state, the first display 241 may move in the third direction (the −x direction) opposite to the second direction (the x direction) and may be inserted into the internal space (not illustrated) of the housing 200 through the slit 213. One end of the first display 241 may be connected to the rotation shaft disposed in the internal space (not illustrated) of the housing 200, and may be inserted into the internal space (not illustrated) of the housing 200 while operating in conjunction with the rotation of the rotation shaft 811. According to an embodiment, in the first state, at least a part of the first display 241 disposed within the housing 200 may be wound in a jelly-roll shape.

According to an embodiment, the housing 200 may provide an internal space (not illustrated) in which various parts (e.g., a printed circuit board, an antenna module, a sensor module, or a battery) of the electronic device 101 may be disposed. In an embodiment, at least some of the various parts of the electronic device 101 disposed in the internal space (not illustrated) of the housing 200 may be visually exposed on the outside through a surface of the main body 210 of the housing 200. According to an embodiment, a part visually exposed on the outside of the main body 210 may include a camera module (not illustrated) (e.g., the camera module 180 in FIG. 1), an acoustic output module (not illustrated) (e.g., the acoustic output module in FIG. 1), and/or sensors. According to an embodiment, the sensors may include at least one of a receiver, a proximity sensor, an ultrasonic sensor, a gesture sensor, a gyro sensor, an atmosphere sensor, a magnetic sensor, an acceleration sensor, a grip sensor, a color sensor, an infrared (IR) sensor, a bio sensor, a temperature sensor, a humidity sensor, or an indicator. For example, at least some of the parts may be disposed under the second display 242 or may be visually exposed on the outside through some area of the second display 242.

In various embodiments of this document, the front surface of the electronic device 101 may be defined as a surface on which a surface of the second display 242 (e.g., a sub-display) of the electronic device 101 is visually displayed on the outside. For example, the front surface of the electronic device 101 may be disposed in the z direction toward which the surface of the second display 242 is directed. According to an embodiment, the second display 242 may be visually viewed through the front surface of the electronic device 101. In various embodiments of this document, the front surface of the electronic device 101 may be defined as a surface on which the slit 213 formed in the main body 210 of the electronic device 101 is visually displayed on the outside.

In various embodiments of this document, the rear surface of the electronic device 101 may be defined as a surface toward a direction opposite to the front surface. For example, the rear surface of the electronic device 101 may be directed toward the −z direction opposite to the z direction. According to an embodiment, the second display 242 may not be visually viewed through the rear surface of the electronic device 101.

In various embodiments of this document, a first state (e.g., a slide-in state) of the electronic device 101 may include a state in which the first display 241 is not viewed on the outside as at least a part of the first display 241 (e.g., a main display) of the electronic device 101 is rolled into the interior of the housing 200. For example, the first state may mean a case where an area in which the first display 241 is viewed on the outside is the smallest. In various embodiments of this document, the first state may be named an insertion state, a slide-in state, or a contraction state.

In various embodiments of this document, a second state (e.g., a slide-out state) of the electronic device 101 may include a state in which the first display 241 is viewed on the outside as the first display 241 (e.g., a main display) of the electronic device 101 is drawn out to the outside of the housing 200. For example, the second state may mean a case where an area in which the first display 241 is viewed on the outside is the greatest. In various embodiments of this document, the second state may be named a drawn state, a slide-out state, or an extension state.

According to an embodiment, the first state may be called a first shape, and the second state may be called a second shape. For example, the first shape may include a normal state, a reduced state, a contraction state, a closed state, or a slide-in state. The second shape may include an extended state, an open state, or a slide-out state.

According to an embodiment, the electronic device 101 may embody a third state, that is, a state between the first state and the second state. For example, the third state may be referred to as a third shape. The third shape may include a free stop state or an intermediate state. For example, the intermediate state may mean a state in which an area between a case where an area in which the first display 241 is viewed on the outside is the smallest and a case where an area in which the first display 241 is viewed on the outside is the greatest is viewed on the outside.

The electronic device 101 according to various embodiments may omit at least one of the elements described with reference to FIGS. 2 and 3 or may additionally include another element.

FIG. 4 is a perspective view of the electronic device 101 for describing a method of changing, by the electronic device 101, a state thereof into a circle mode by using a magnet according to an embodiment of the disclosure.

The electronic device 101 illustrated in FIG. 4 may include an embodiment at least some of which are similar to or different from the electronic device 101 described with reference to FIGS. 2 and 3. Hereinafter, characteristics of the electronic device 101, which have not been described, are in priority described with reference to FIG. 4.

Referring to FIG. 4, the electronic device 101 according to an embodiment may include the cylindrical housing 200, the rollable display 241 inserted into the interior of the housing 200 or drawn out from the interior of the housing 200 through the slit 213 formed in the side part 211 of the housing 200, and the handler member 250 combined with the end of the rollable display 241.

According to an embodiment, the electronic device 101 may include at least one camera module 180 (e.g., the camera module 180 in FIG. 1) disposed in the side part 211 of the housing 200. According to an embodiment, the electronic device 101 may include a plurality of camera modules 180 at view angles at which the camera module 180 is capable of photographing so that photographing in a 360-degree direction is possible from the electronic device 101. For example, if a view angle at which one camera module 180 is capable of photographing is 120 degrees, the electronic device 101 may perform photographing in the 360-degree direction from the electronic device 101 by including three camera modules 180.

According to another embodiment, the electronic device 101 may include one camera module 180 of the housing 200, but a part 200a of the housing 200 in which the camera module 180 is disposed may rotate on the basis of a virtual central axis CA that penetrates the housing 200. For example, as the part 200a of the housing 200 in which the camera module 180 is disposed is rotated, the camera module 180 may be capable of photographing in the 360-degree direction from the electronic device 101.

According to an embodiment, the electronic device 101 may include a plurality of magnets 411 and 412 for attaching an end of the rollable display 241 (e.g., the first display 241 in FIG. 3) to the side part 211 of the housing 200. According to an embodiment, the electronic device 101 may include at least one first magnet 411 disposed in a way to be adjacent to the slit 213 through which the rollable display 241 is drawn out from the internal space (not illustrated) of the housing 200 and at least one second magnet 412 disposed in the handler member 250. According to an embodiment, since the polarity of the first magnet 411 and the polarity of the second magnet 412 are differently formed, attraction by which the first magnet 411 and the second magnet 412 pull each other when the first magnet 411 and the second magnet 412 are adjacent to each other may be generated. For example, the first magnet 411 may be disposed to have an S pole, and the second magnet 412 may be disposed to have an N pole.

Figure 5:
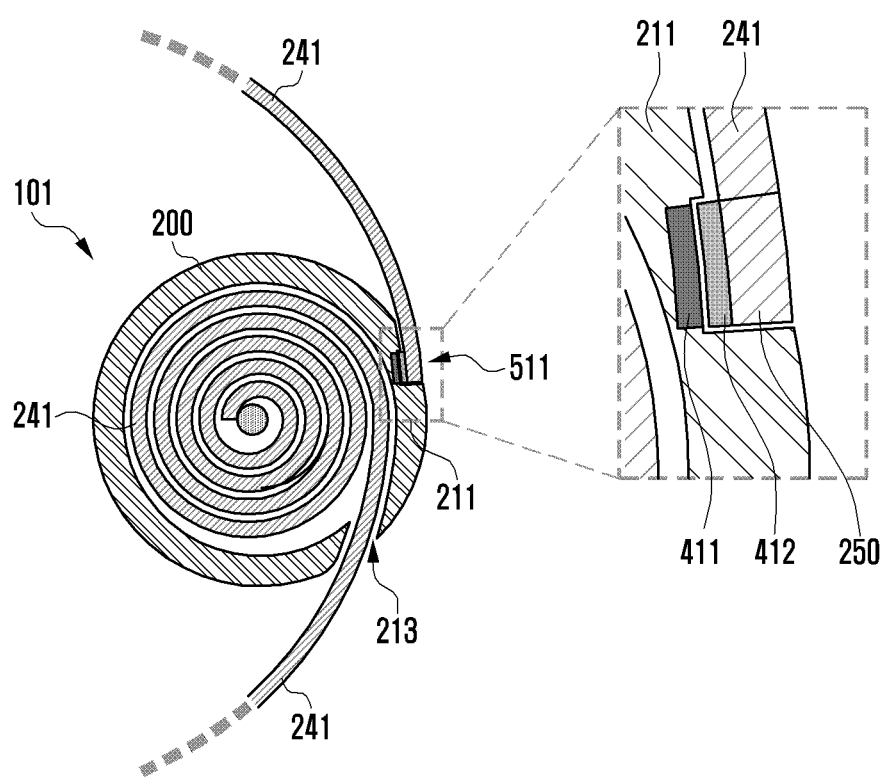
FIG. 5 is a cross-sectional view illustrating the state in which a handler member of the electronic device has been attached to a surface of a housing according to an embodiment of the disclosure.

FIG. 5 is a cross-sectional view illustrating the state in which the handler member 250 of the electronic device 101 has been attached to a surface of the housing 200 according to an embodiment of the disclosure.

For example, FIG. 5 may be a cross-sectional view of the electronic device 101 illustrated in FIG. 2, which is viewed from an xz plane.

Figure 6:
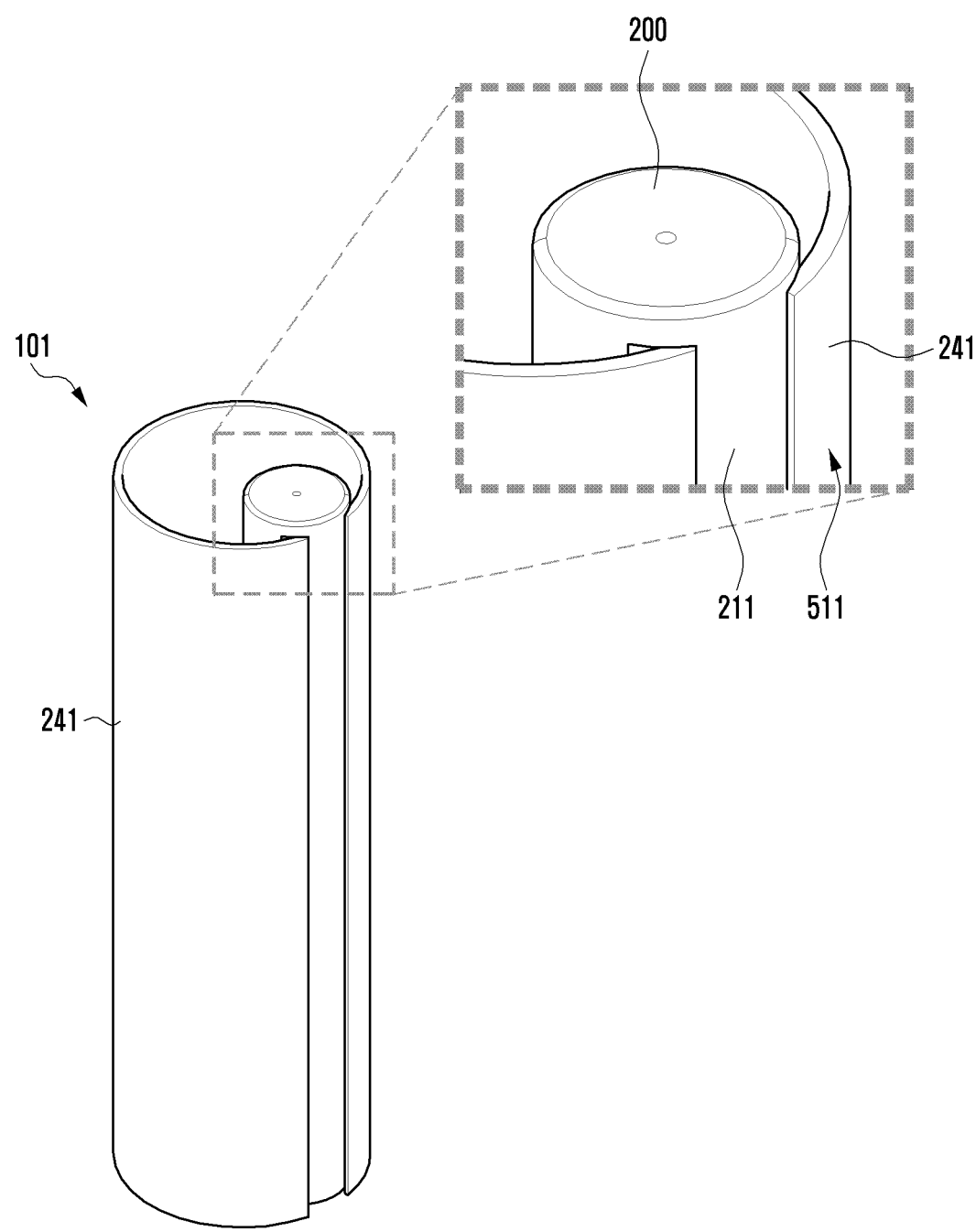
FIG. 6 is a perspective view illustrating the state in which the handler member of the electronic device has been attached to a surface of the housing according to an embodiment of the disclosure.

FIG. 6 is a perspective view illustrating the state in which the handler member 250 of the electronic device 101 has been attached to a surface of the housing 200 according to an embodiment of the disclosure.

Figure 7:
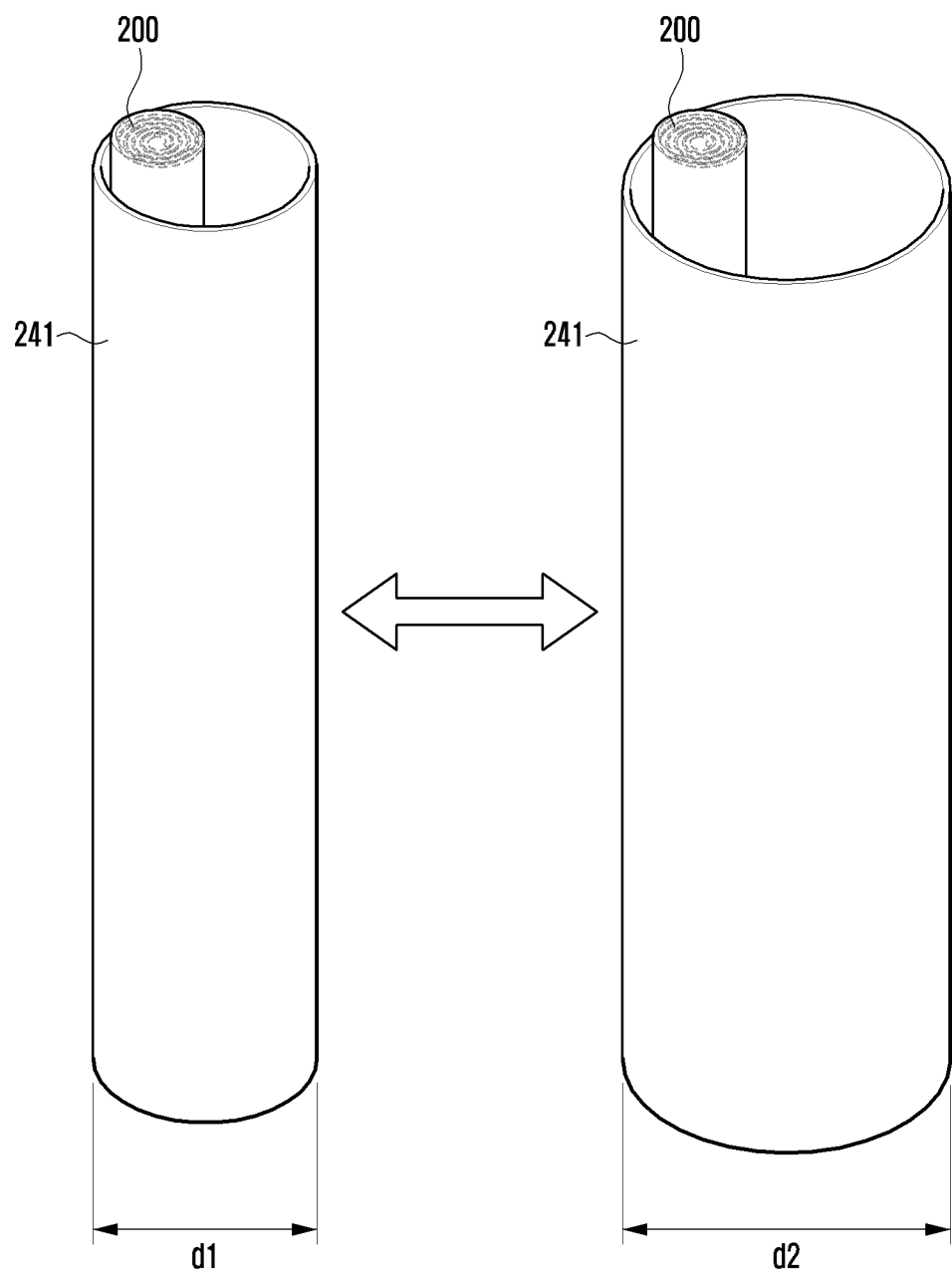
FIG. 7 is an example describing that the electronic device changes a shape of a rollable display in a circle mode according to an embodiment of the disclosure.

FIG. 7 is an example describing that the electronic device 101 changes a shape of the rollable display 241 in a circle mode according to an embodiment of the disclosure.

The electronic device 101 illustrated in FIGS. 5 to 7 may include an embodiment at least some of which are similar to or different from the electronic device 101 described with reference to FIGS. 2 to 4. Hereinafter, characteristics of the electronic device 101, which have not been described, are in priority described with reference to FIGS. 5 to 7.

Referring to FIGS. 5 and 6, in the second state of the electronic device 101, a user of the electronic device 101 according to an embodiment may wind the housing 200 so that the rollable display 241 (e.g., the first display 241 in FIG. 3) surrounds the outskirts of the side part 211, and may change a state of the electronic device 101 from the second state to a circle mode (or a circle state) by attaching the handler member 250 to a part (e.g., a hall sensor area 511) of the side part 211 in the state in which the rollable display 241 has wound the outskirts of the side part 211. According to an embodiment, the handler member 250 may be attached to the part (e.g., the hall sensor area 511) of the side part 211 as the second magnet 412 of the handler member 250 is combined with the first magnet 411 disposed in the part (e.g., the hall sensor area 511) of the side part 211. According to an embodiment, the electronic device 101 may start to change its state into a circle mode when detecting that the handler member 250 is fixed to the side part 211 as the second magnet 412 and the first magnet 411 are combined.

According to an embodiment, the hall sensor area 511 combined with the second magnet 412 of the handler member 250 may be formed in a recess shape in a part of the side part 211. According to another embodiment, the side part 211 may not include the recess shape, and the second magnet 412 of the handler member 250 may be combined with the hall sensor area 511 disposed in a part of the side part 211 by magnetism. Accordingly, the handler member 250 may be fixed to the side part 211 by magnetism although a structure, such as a recess, is not formed in the side part 211.

According to an embodiment, the side part 211 of the electronic device 101 may include the hall sensor area 511 in which the first magnet 411 is disposed. At least one hall sensor (not illustrated) for detecting that the handler member 250 is attached to a part (e.g., the hall sensor area 511) of the side part 211 may be disposed in the hall sensor area 511. According to an embodiment, the hall sensor area 511 may be disposed in a way to be adjacent to the slit 213 through which the rollable display 241 is drawn out. According to an embodiment, the electronic device 101 may include a plurality of hall sensor areas 511. The first magnet 411 may be disposed in each of the plurality of hall sensor areas 511.

According to an embodiment, in a circle mode in which the handler member 250 of the electronic device 101 is attached to the hall sensor area 511, the rollable display 241 may be disposed to wind the outskirts of the housing 200. One end of the rollable display 241 may be fixed between the second magnet 412 disposed in the handler member 250 and the first magnet 411 disposed in the hall sensor area 511 of the housing 200 by magnetism.

Referring to FIG. 7, in the electronic device 101 according to an embodiment, in a circle mode, as a part of the rollable display 241 is drawn out through a slit (e.g., the slit 213 in FIG. 6) with one end of the rollable display 241 being fixed to the housing 200, a display area of the rollable display 241 may have a cylindrical shape, but a cylindrical diameter d1, d2 thereof may be increased. In the electronic device 101 according to an embodiment, in a circle mode, as a part of the rollable display 241 is inserted into the slit 213 through the slit 213 with one end of the rollable display 241 being fixed to the housing 200, the display area of the rollable display 241 may have a cylindrical shape, but the cylindrical diameter d1, d2 thereof may be decreased. The electronic device 101 according to an embodiment may change the size of a display area of the rollable display 241 by drawing out or inserting a part of the rollable display 241 through the slit 213 in the state in which one end of the rollable display 241 has been fixed to the housing 200 in a circle mode.

According to various embodiments, the electronic device 101 may change the size of the rollable display 241 based on the amount of information displayed through the rollable display 241 in a circle mode. For example, in a circle mode, when the amount of information displayed through the rollable display 241 is much, the electronic device 101 may increase the size of a display area of the rollable display 241 by drawing out a part of the rollable display 241 through the slit 213. For example, in a circle mode, when the amount of information displayed through the rollable display 241 is small, the electronic device 101 may decrease the size of the display area by inserting a part of the rollable display 241 through the slit 213. According to an embodiment, the electronic device 101 may insert or draw out a part of the rollable display 241 by using a motor (not illustrated) disposed in the internal space of the housing 200.

According to various embodiments, in a circle mode, the electronic device 101 may change the number of execution screens of an application displayed through the display area of the rollable display 241 based on the size of the display area. For example, in a circle mode, the electronic device 101 may display execution screens of n applications corresponding to a first size when the display area of the rollable display 241 has the first size, and may display execution screens of m applications corresponding to a second size when the display area of the rollable display 241 has the second size larger than the first size.

Figure 8:
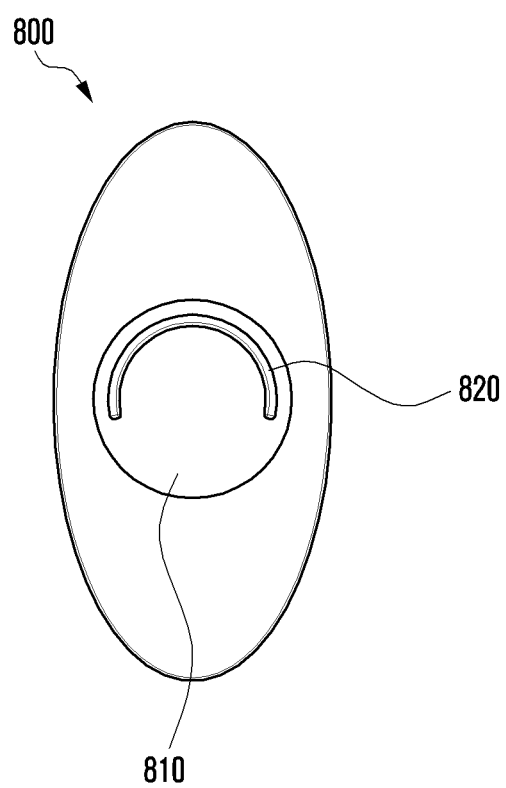
FIG. 8 is a diagram of a holder of the electronic device, which is viewed from an upper direction according to an embodiment of the disclosure.

FIG. 8 is a diagram of the holder of the electronic device 101, which is viewed from an upper direction according to an embodiment of the disclosure.

Figure 9:
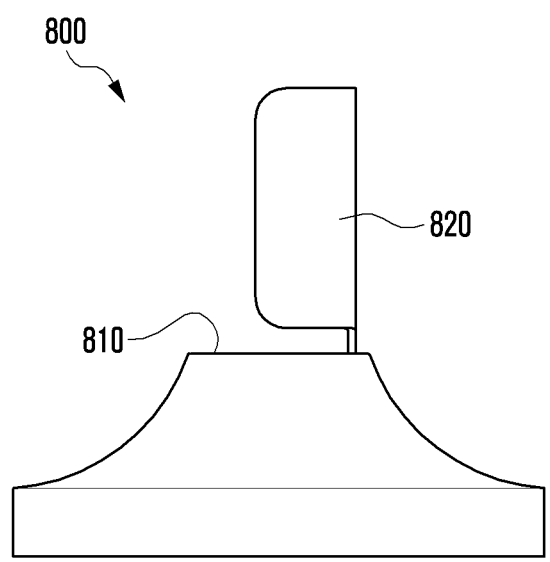
FIG. 9 is a diagram of the holder of the electronic device, which is viewed from a lateral direction according to an embodiment of the disclosure.

FIG. 9 is a diagram of the holder of the electronic device 101, which is viewed from a lateral direction according to an embodiment of the disclosure.

Figure 10:
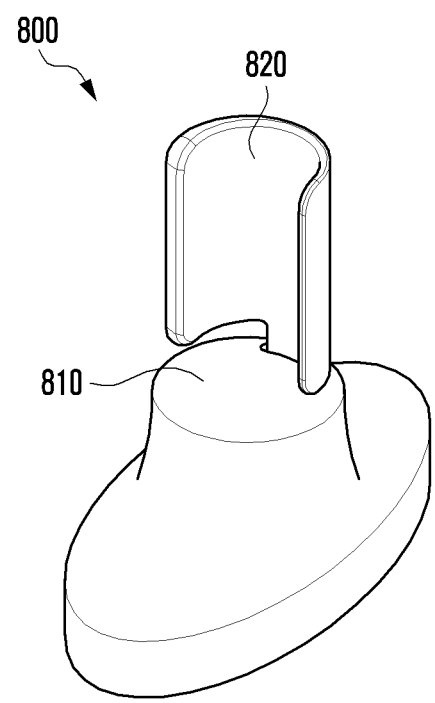
FIG. 10 is a diagram of the holder of the electronic device, which is viewed from a diagonal direction according to an embodiment of the disclosure.

FIG. 10 is a diagram of the holder of the electronic device 101, which is viewed from a diagonal direction according to an embodiment of the disclosure.

Figure 11:
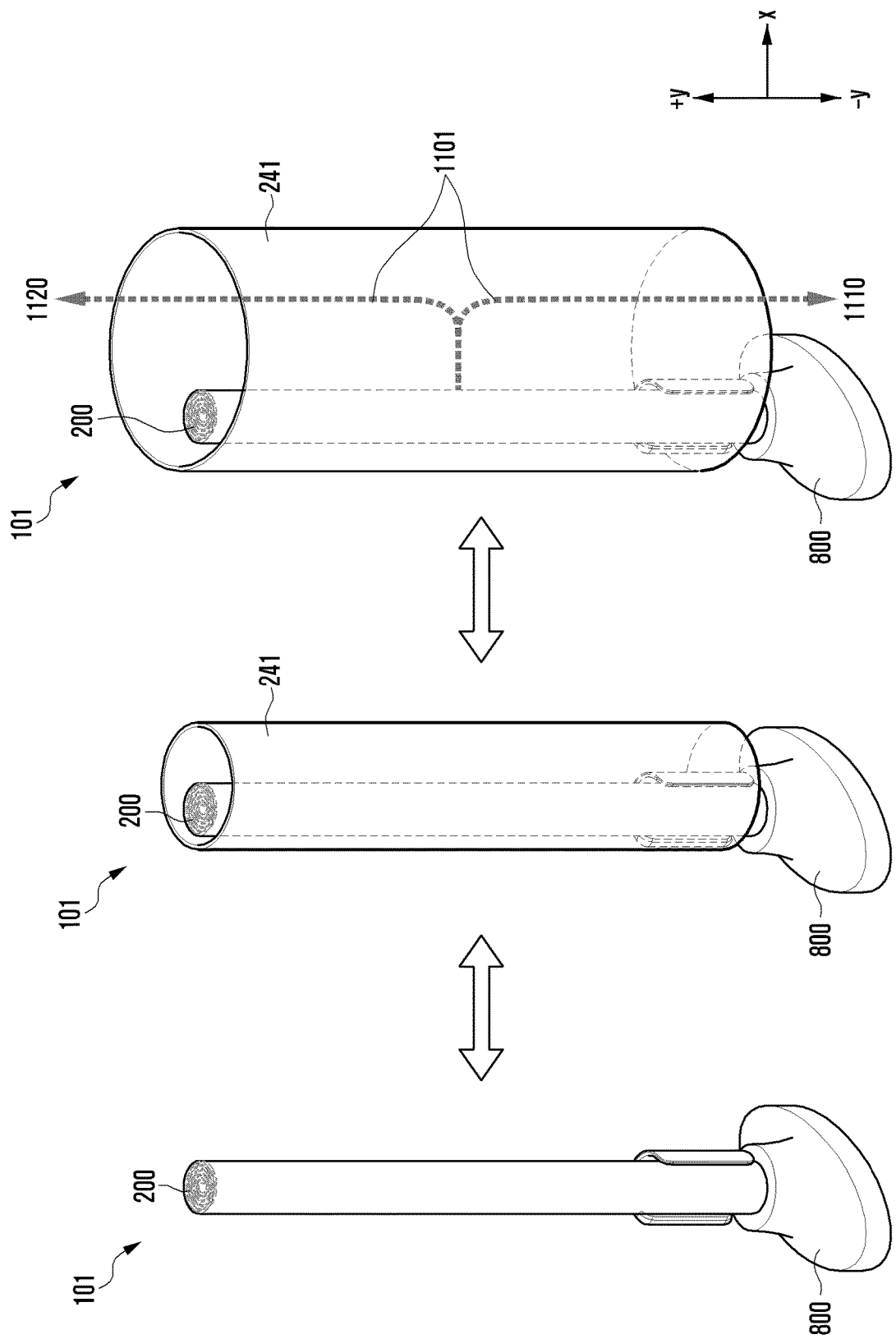
FIG. 11 is an example describing that the electronic device changes a shape of the rollable display in the state in which the electronic device has been held according to an embodiment of the disclosure.

FIG. 11 is an example describing that the electronic device 101 changes a shape of the rollable display 241 in the state in which the electronic device 101 has been held according to an embodiment of the disclosure.

The electronic device 101 illustrated in FIG. 11 may include an embodiment at least some of which are similar to or different from the electronic device 101 described with reference to FIGS. 2 to 7. Hereinafter, characteristics of the electronic device 101, which have not been described, are in priority described with reference to FIGS. 8 to 11.

Referring to FIGS. 8 to 10, the electronic device 101 according to an embodiment may further include a holder in which the electronic device 101 may be held as an accessory. According to an embodiment, the holder may perform a function of a charging cradle for charging a battery (e.g., the battery in FIG. 1) of the electronic device 101 in addition to the function for holding the electronic device 101. According to an embodiment, a wireless charging coil for wirelessly supplying power may be embedded in the holder. According to another embodiment, the holder may include a pogo pin that is not illustrated, and may supply power to the electronic device 101 when a terminal (not illustrated) formed in the housing 200 of the electronic device 101 comes into contact with the pogo pin.

According to an embodiment, the holder 800 may have a stand shape, and may include a seated surface 810 on which a planar part (e.g., the first planar part 220 or the second planar part 230 in FIG. 2) of the electronic device 101 may be seated and a holding surface 820 surrounding a part of the side part 211 of the electronic device 101 as the holding surface is formed in a direction perpendicular to the seated surface 810. For example, the holding surface 820 may have a cylindrical shape having designated curvature in a way to correspond to curvature of the side part 211 of the electronic device 101. According to an embodiment, a first planar part (e.g., the first planar part 220 in FIG. 2) and/or second planar part (e.g., the second planar part 230 in FIG. 2) of the electronic device 101 may be combined with the seated surface 810 of the holder 800.

According to an embodiment, the holder 800 may include at least one third magnet (not illustrated) for being attached to a first magnet (e.g., the first magnet 411 in FIG. 4) of the electronic device 101. According to an embodiment, the third magnet of the holder 800 may be disposed in at least one area of the seated surface 810 of the holder 800 or the holding surface 820 of the holder 800. For example, the third magnet may be disposed only on the seated surface 810, may be disposed only on the holding surface 820, or may be disposed on both the seated surface 810 and the holding surface 820.

According to an embodiment, as described above, a wireless charging coil (not illustrated) for wirelessly supplying power to the electronic device 101 may be embedded in the holder 800. The wireless charging coil of the holder 800 may be disposed in at least one area of the seated surface 810 of the holder 800 or the holding surface 820 of the holder 800. For example, the wireless charging coil of the holder 800 may be disposed only on the seated surface 810, may be disposed only on the holding surface 820 or may be disposed on both the seated surface 810 and the holding surface 820.

Referring to FIG. 11, the electronic device 101 according to an embodiment may change its state into a circle mode in the state in which the electronic device 101 has been attached to the holder 800. For example, a user may change a state of the electronic device 101 into a circle mode by attaching a handler member (e.g., the handler member 250 in FIG. 4) to a side part (e.g., the side part 211 in FIG. 4) in the state in which the electronic device 101 has been held in the holder 800. The electronic device 101 according to an embodiment may change the size of the rollable display 241 (e.g., the first display 241 in FIG. 3) based on a designated event, in the state in which the electronic device 101 has been held in the holder 800 and a state thereof has changed into a circle mode. For example, the designated event may include a user input or alarm reception (e.g., message reception, or a call request) received through a specific application.

According to an embodiment, the electronic device 101 may include a speaker (not illustrated) as an acoustic output module (e.g., the acoustic output module 155 in FIG. 1). The speaker may be disposed in the side part 211 of the electronic device 101. According to an embodiment, as the speaker of the electronic device 101 is disposed in the side part 211 of the housing 200, a sound 1101 outputted from the speaker may be radiated in the lateral direction of the electronic device 101. For example, the housing 200 of the electronic device 101 may have a pole shape having a length in a y direction. The speaker of the electronic device 101 may output the sound 1101 in an x direction perpendicular to the y direction.

According to an embodiment, in a circle mode of the electronic device 101, the sound 1101 outputted in a lateral direction (e.g., the x direction) of the electronic device 101 from the speaker may be radiated to an internal space formed by the rollable display 241 disposed in a cylindrical shape. The sound 1101 radiated to the internal space may be radiated in an upward direction (e.g., the y direction) or a downward direction (e.g., a −y direction) from the internal space. For example, according to an embodiment, in a circle mode of the electronic device 101, the sound 1101 outputted in a lateral direction (e.g., the x direction) of the electronic device 101 from the speaker may be radiated in a downward direction (e.g., the −y direction) as in an arrow 1110 in FIG. 11 or may be radiated in an upward direction (e.g., the y direction) from the internal space formed by the rollable display 241 as in an arrow 1120 in FIG. 11. Accordingly, the electronic device 101 according to an embodiment can provide a stereophonic sound effect because the volume of the sound 1101 is expanded in a circle mode.

Figure 12:
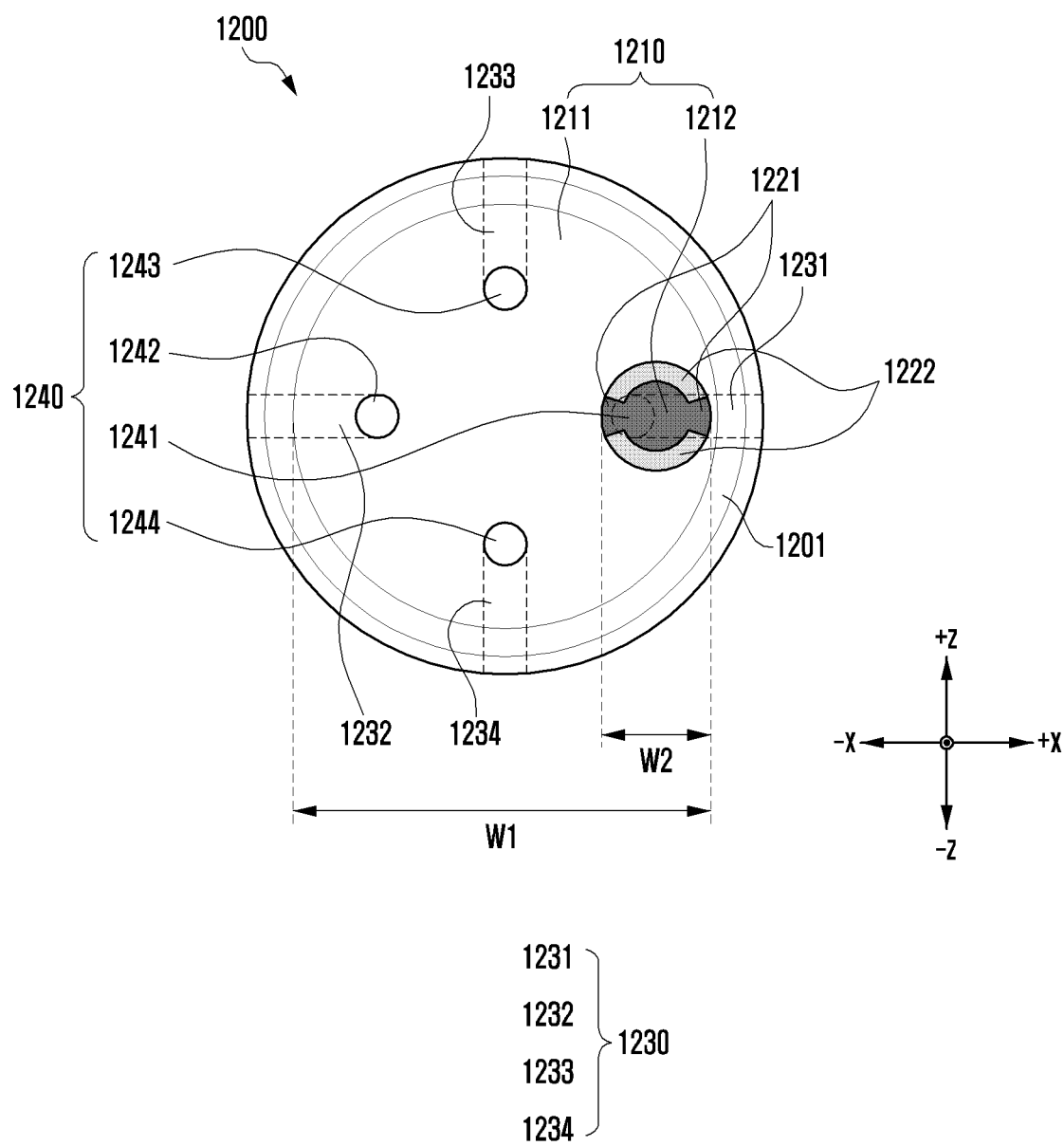
FIG. 12 is a diagram of the holder of the electronic device, which is viewed from an upper direction according to an embodiment of the disclosure.

FIG. 12 is a diagram of the holder of the electronic device 101, which is viewed from an upper direction according to an embodiment of the disclosure.

Figure 13:
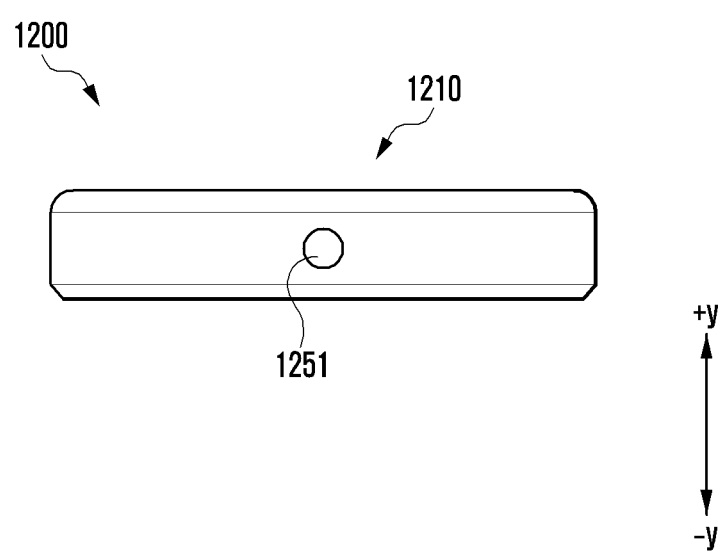
FIG. 13 is a diagram of the holder of the electronic device, which is viewed from a lateral direction according to an embodiment of the disclosure.

FIG. 13 is a diagram of the holder of the electronic device 101, which is viewed from a lateral direction according to an embodiment of the disclosure.

Figure 14:
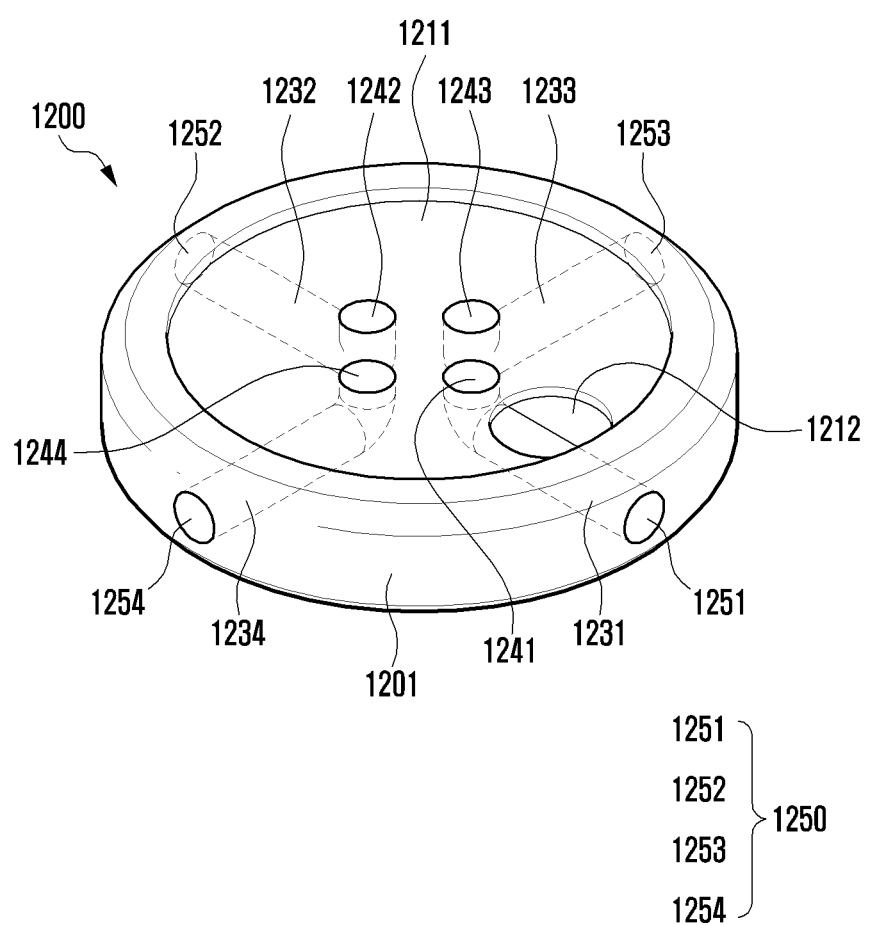
FIG. 14 is a diagram of the holder of the electronic device, which is viewed from a diagonal direction according to an embodiment of the disclosure.

FIG. 14 is a diagram of the holder of the electronic device 101, which is viewed from a diagonal direction according to an embodiment of the disclosure.

Figure 15:
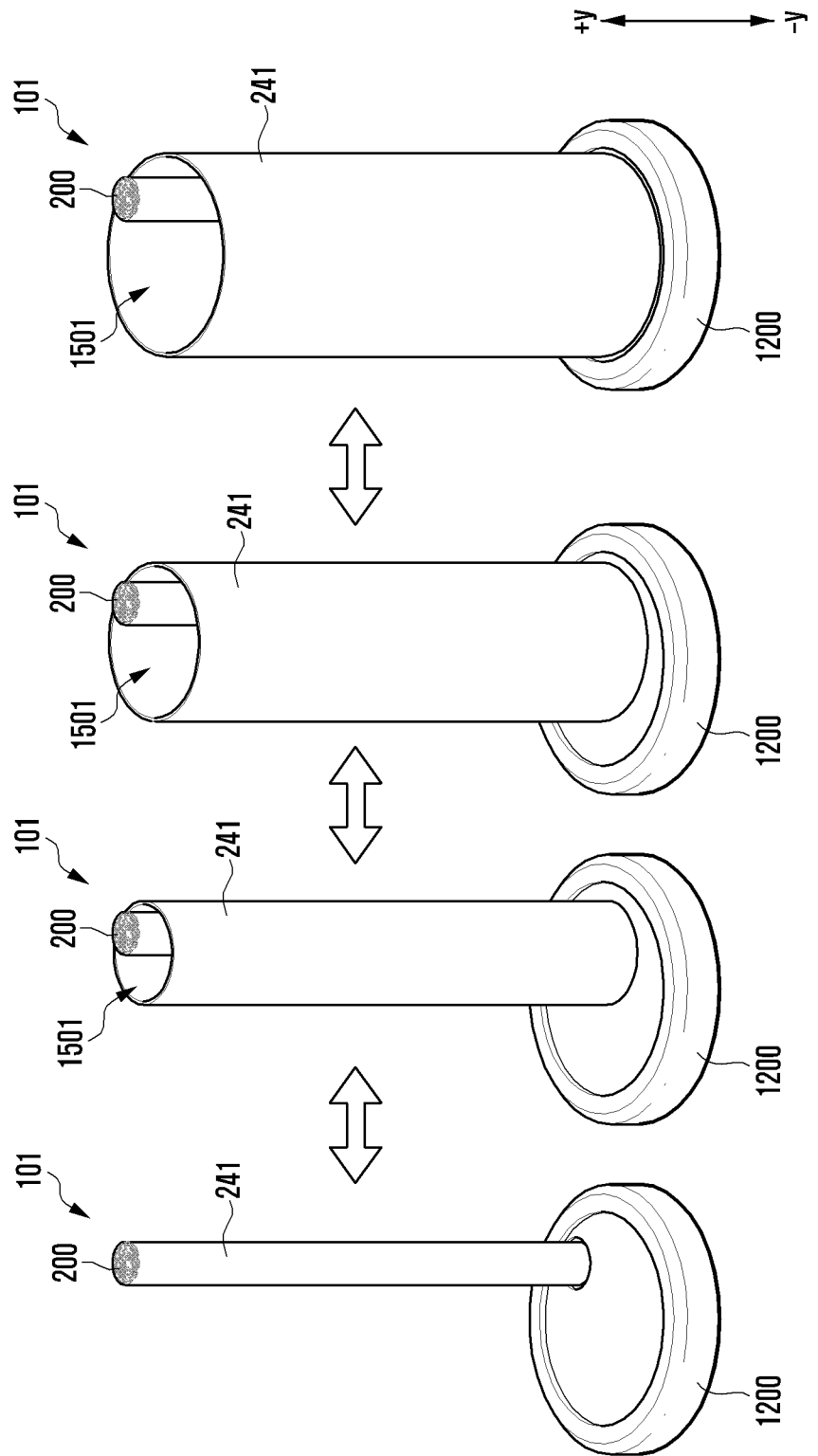
FIG. 15 is an example describing that the electronic device changes a shape of the rollable display in the state in which the electronic device has been held according to an embodiment of the disclosure.

FIG. 15 is an example describing that the electronic device 101 changes a shape of the rollable display 241 in the state in which the electronic device 101 has been held according to an embodiment of the disclosure.

The electronic device 101 illustrated in FIG. 15 may include an embodiment at least some of which are similar to or different from the electronic device 101 described with reference to FIGS. 2 to 7. Hereinafter, characteristics of the electronic device 101, which have not been described, are in priority described with reference to FIGS. 12 to 15.

Referring to FIGS. 12 to 15, the electronic device 101 according to another embodiment may further include a holder in which the electronic device 101 may be held as an accessory. The holder illustrated in FIGS. 12 to 15 may have a flat panel shape unlike the holder illustrated in FIGS. 8 to 10.

According to another embodiment, the holder 1200 may have a main body 1201 having a circular flat panel shape. A seated surface 1210 on which the electronic device 101 is seated may be formed on the main body 1201.

According to another embodiment, the seated surface 1210 may include a circular first recess 1211 having a diameter W1 having a size greater than or equal to a maximum diameter of the rollable display 241 so that an edge portion in a downward direction (e.g., a −y direction) of the rollable display 241 (e.g., the first display 241 in FIG. 3) is covered when a state of the electronic device 101 is a circle mode. According to another embodiment, a second recess 1212 in which the housing 200 of the electronic device 101 is seated may be formed in the first recess 1211 of the seated surface 1210. The second recess 1212 may have a lower height than the first recess 1211. The second recess 1212 may have a circular shape having a diameter W2 having a size corresponding to the diameter of the first planar part 220 (or the diameter of the second planar part) so that a first planar part (e.g., the first planar part 220 in FIG. 2) and/or second planar part (e.g., the second planar part 230 in FIG. 2) of the electronic device 101 may be combined. A wireless charging coil (not illustrated) for wirelessly supplying power to the electronic device 101 may be embedded in the second recess 1212. According to another embodiment, a pogo pin (not illustrated) may be formed in the second recess 1212. The holder 1200 may supply power to the electronic device 101 when a terminal (not illustrated) formed in the housing 200 of the electronic device 101 comes into contact with the pogo pin.

According to another embodiment, a plurality of third magnets 1221 and 1222 may be disposed in the second recess 1212. The third magnets 1221 and 1222 disposed in the second recess 1212 may guide a direction in which the electronic device 101 is held as the third magnets 1221 and 1222 are arranged in a designated shape or a designated direction. For example, the magnets 1221 having a first polarity (e.g., the S pole) may be disposed at both ends on the left and right of the second recess 1212. The magnets 1222 having a second polarity (e.g., the N pole) opposite to the first polarity (e.g., the S pole) may be disposed at both ends on the upper and lower sides of the second recess 1212. Accordingly, when the electronic device 101 is seated in the second recess 1212 of the holder 1200, the electronic device 101 may be guided to be directed toward a given direction.

According to another embodiment, the main body 1201 of the holder 1200 may include a plurality of duct lines 1230 for controlling a direction in which a sound outputted from the electronic device 101 is radiated. According to another embodiment, the plurality of duct lines 1230 may be formed to connect a hole 1240 formed in a surface of the first recess 1211 and a hole 1250 formed in a side surface of the main body 1201.

According to another embodiment, when the first recess 1211 is viewed from an upward direction (e.g., the y direction), a first upper hole 1241 disposed in an +x direction, a second upper hole 1242 disposed in a −x direction, a third upper hole 1243 disposed in a +z direction, and a fourth upper hole 1244 disposed in a −z direction may be formed in a surface of the first recess 1211.

According to another embodiment, a first side hole 1251 disposed in the +x direction, a second side hole 1252 disposed in the −x direction, a third side hole 1253 disposed in the +z direction, and a fourth side hole 1254 disposed in the −z direction may be formed in the side surface of the main body 1201 of the holder 1200.

According to another embodiment, a first duct line 1231 interconnecting the first upper hole 1241 and the first side hole 1251, a second duct line 1232 interconnecting the second upper hole 1242 and the second side hole 1252, a third duct line 1233 interconnecting the third upper hole 1243 and the third side hole 1253, and a fourth duct line 1234 interconnecting the fourth upper hole 1244 and the fourth side hole 1254 may be formed within the main body 1201 of the holder 1200.

According to various embodiments, in a circle mode of the electronic device 101, a sound outputted in a lateral direction (e.g., the x direction) of the electronic device 101 from the speaker may be radiated to an internal space (e.g., the space 1501 in FIG. 15) formed by the rollable display 241 disposed in a cylindrical shape. A sound (e.g., the sound 1101 in FIG. 11) radiated to the internal space 1501 may be radiated in an upward direction (e.g., the y direction) or a downward direction (e.g., the −y direction) from the internal space 1501. A sound radiated in a downward direction (e.g., the −y direction) may be introduced into the first upper hole to fourth upper holes 1241, 1242, 1243, and 1244 of the holder 1200. According to another embodiment, the sound introduced into the first upper hole to the fourth upper holes 1241, 1242, 1243, and 1244 may be radiated to the first side hole to the fourth side holes 1251, 1252, 1235, and 1254 via the first duct line to fourth duct lines 1231, 1232, 1233, and 1234. Accordingly, the electronic device 101 according to another embodiment can provide a stereophonic sound effect because the volume of a sound (e.g., the sound 1101 in FIG. 11) is expanded in a circle mode.

According to an embodiment, the holder 1200 may communicate with the electronic device 101 by using a wired communication, wireless communication, or short-distance communication method, and may change a direction in which a sound (e.g., the sound 1101 in FIG. 11) is outputted based on control of the electronic device 101 through the communication. For example, the holder 1200 may have embedded therein an amplifier (not illustrated) for amplifying or attenuating a sound (e.g., the sound 1101 in FIG. 11) introduced into each of the first duct line to the fourth duct lines 1231, 1232, 1233, and 1234. The holder 1200 may output a sound only through a side hole (e.g., at least one of the first side hole to fourth side holes 1251, 1252, 1235, and 1254) disposed in a specific direction from the holder 1200 by controlling the amplifier based on an instruction (e.g., the reception of a control signal) of the electronic device 101. For example, the electronic device 101 may detect a location of a user in the state in which the electronic device 101 has been held in the holder 1200, and may dynamically control a direction in which a sound is outputted from the holder 1200 based on a location of a user being detected. For example, when a user is located in the +x direction from the holder 1200, the electronic device 101 may detect that the user is located in the +x direction from the electronic device 101 through a camera module (e.g., the camera module 180 in FIG. 1), and may control the holder 1200 to output a sound only through the first side hole 1251.

With reference to FIG. 15, the electronic device 101 according to another embodiment may change its state into a circle mode in the state in which the electronic device 101 has been attached to the holder 1200. For example, a user may change a state of the electronic device 101 into a circle mode by attaching the handler member 250 to the side part 211 in the state in which the electronic device 101 has been held in the holder 1200. The electronic device 101 may change the size of the rollable display 241 based on a designated event, in the state in which the electronic device 101 has been held in the holder 1200 and has changed its state into a circle mode. For example, the designated event may include a user input or alarm reception (e.g., message reception or a call request) received through a specific application.

Figure 16:
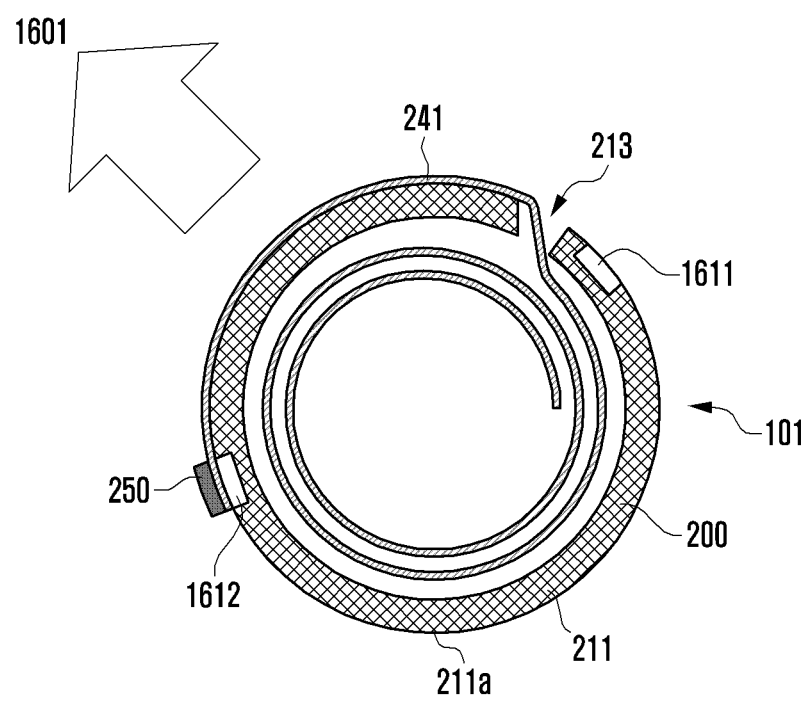
FIG. 16 is an example describing a method of providing, by the electronic device, various circle modes by using a plurality of hall sensors according to an embodiment of the disclosure.

FIG. 16 is an example describing a method of providing, by the electronic device 101, various circle modes by using a plurality of hall sensors according to an embodiment of the disclosure.

Figure 17:
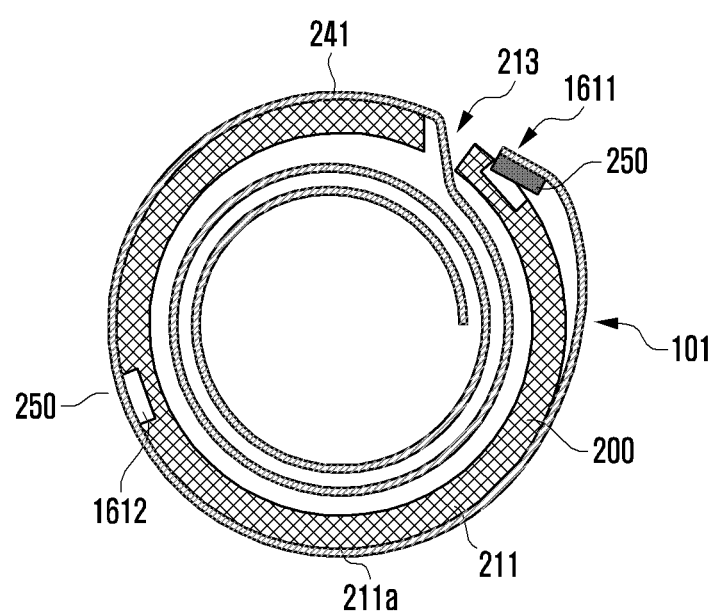
FIG. 17 is another example describing a method of providing, by the electronic device, various circle modes by using the plurality of hall sensors according to an embodiment of the disclosure.

FIG. 17 is another example describing a method of providing, by the electronic device 101, various circle modes by using the plurality of hall sensors according to an embodiment of the disclosure.

The electronic device 101 illustrated in FIGS. 16 and 17 may include an embodiment at least some of which are similar to or different from the electronic device 101 described with reference to FIGS. 2 to 15. Hereinafter, characteristics of the electronic device 101, which have not been described, are in priority described with reference to FIGS. 16 and 17.

Referring to FIGS. 16 and 17, the electronic device 101 according to an embodiment may include a plurality of hall sensor areas 1611 and 1612 (e.g., the hall sensor area 511 in FIG. 5) including hall sensors for detecting the attachment of the handler member 250. For example, in the electronic device 101, a first hall sensor area 1611 may be disposed in a part of the side part 211 of the housing 200 adjacent to the slit 213 through which a rollable display 241 (e.g., the first display 241 in FIG. 3) is drawn out or inserted therein, and a second hall sensor area 1612 may also be disposed in another part of the side part 211 adjacent to a side opposite to the slit 213. According to an embodiment, although not illustrated, the hall sensor areas 1611 and 1612 may be disposed in plural at intervals along an outer circumference surface 211a of the side part 211.

Referring to FIG. 16, a user of the electronic device 101 according to an embodiment may draw out the rollable display 241 from the slit 213, but may draw out the rollable display 241 so that the length of the drawn rollable display 241 is a length (e.g., a length corresponding to half of the circumference of the side part 211) shorter than the length of the circumference of the side part 211. A user may attach an end (e.g., the handler member 250) of the rollable display 241 to the second hall sensor area 1612. Accordingly, a display area of the rollable display 241 may display an image in the state in which the rollable display 241 has been closely attached to some surface of the side part 211. For example, the rollable display 241 may have a length corresponding to half of the circumference of the side part 211, and may provide a screen only in a specific direction (e.g., a direction 1601 in FIG. 16) in a circle mode of the electronic device 101.

Referring to FIG. 17, a user of the electronic device 101 according to an embodiment may draw out the rollable display 241 from the slit 213, but may draw out the rollable display 241 so that the length of the drawn rollable display 241 is substantially identical with the length of the circumference of the side part 211. A user may attach an end (e.g., the handler member 250) of the rollable display 241 to the first hall sensor area 1612. Accordingly, a display area of the rollable display 241 may display an image in the state in which the rollable display 241 has been closely attached to the outer circumference surface 211a of the side part 211. For example, the rollable display 241 may provide a screen in the entire 360-degree direction in a circle mode of the electronic device 101.

Figure 18:
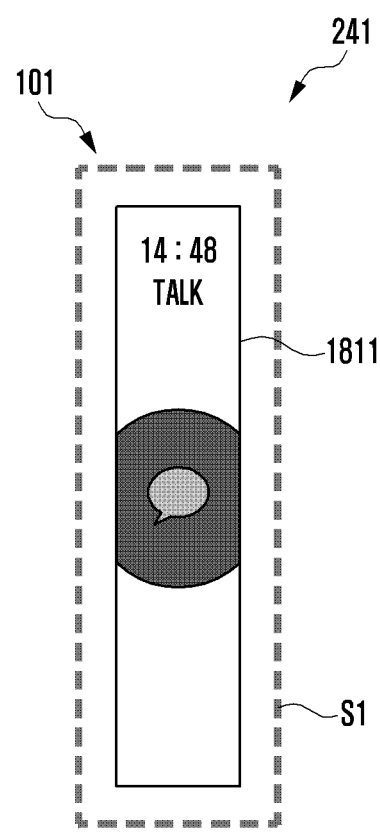
FIG. 18 is an example illustrating the state in which the electronic device has controlled the rollable display to have a first size based on a distance from a user being recognized according to an embodiment of the disclosure.

FIG. 18 is an example illustrating the state in which the electronic device 101 has controlled the rollable display 241 to have a first size based on a distance from a user being recognized according to an embodiment of the disclosure.

Figure 19:
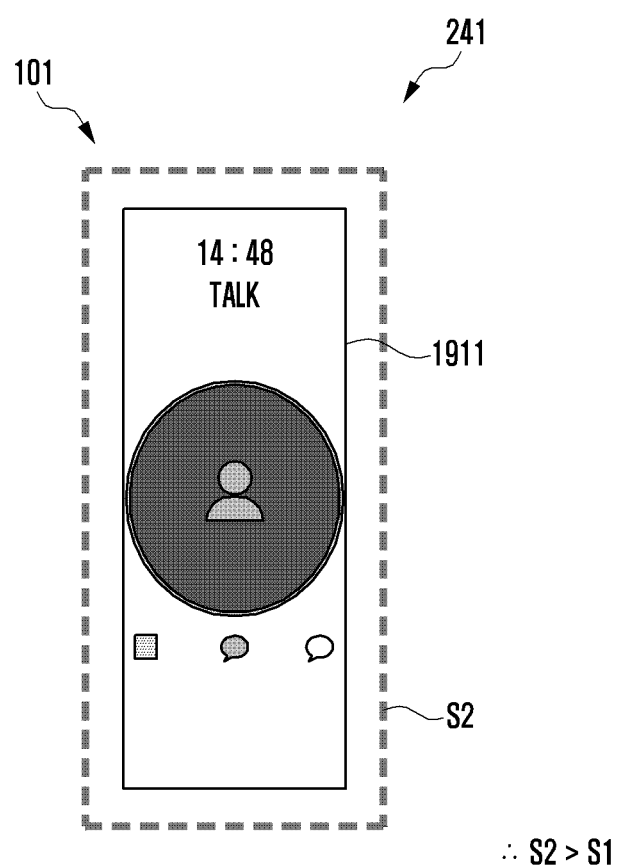
FIG. 19 is an example illustrating the state in which the electronic device has controlled the rollable display to have a second size based on a distance from a user being recognized according to an embodiment of the disclosure.

FIG. 19 is an example illustrating the state in which the electronic device 101 has controlled the rollable display 241 to have a second size based on a distance from a user being recognized according to an embodiment of the disclosure.

Figure 20:
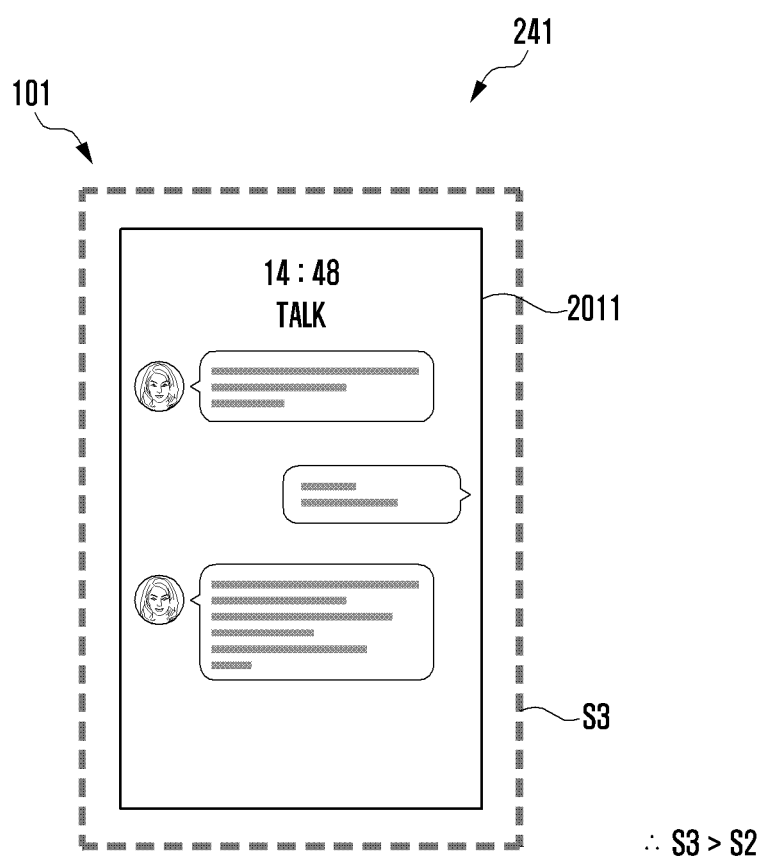
FIG. 20 is an example illustrating the state in which the electronic device has controlled the rollable display to have a third size based on a distance from a user being recognized according to an embodiment of the disclosure.

FIG. 20 is an example illustrating the state in which the electronic device 101 has controlled the rollable display 241 to have a third size based on a distance from a user being recognized according to an embodiment of the disclosure.

Figure 21:
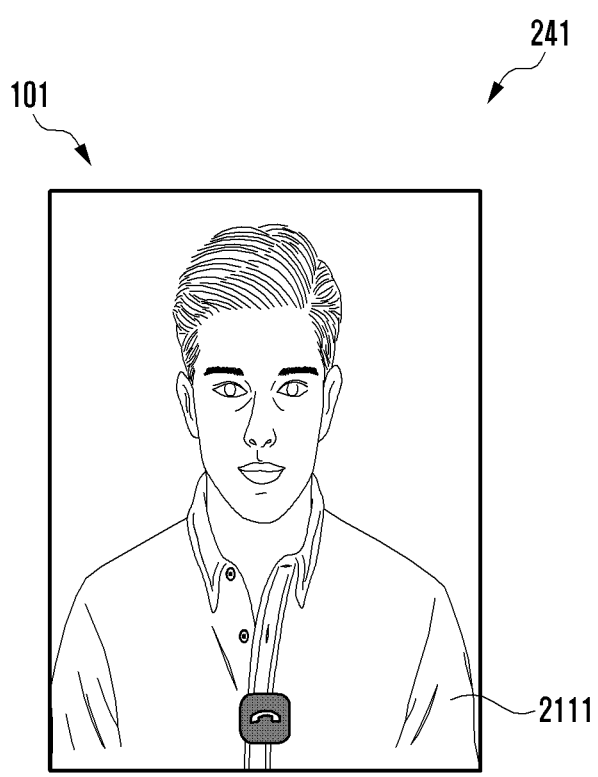
FIG. 21 is another example illustrating the state in which the electronic device has controlled the rollable display to have a third size based on a distance from a user being recognized according to an embodiment of the disclosure.

FIG. 21 is another example illustrating the state in which the electronic device 101 has controlled the rollable display 241 to have a third size based on a distance from a user being recognized according to an embodiment of the disclosure.

The electronic device 101 illustrated in FIGS. 18 to 21 may include an embodiment at least some of which are similar to or different from the electronic device 101 described with reference to FIGS. 2 to 17. Hereinafter, characteristics of the electronic device 101, which have not been described, are in priority described with reference to FIGS. 18 to 21.

Referring to FIGS. 18 to 20, the electronic device 101 according to an embodiment may detect a distance between the electronic device 101 and a user by using the camera module 180 or a time of flight (TOF) sensor or a light detection and ranging (LiDAR) sensor, and may change the size of a rollable display 241 (e.g., the first display 241 in FIG. 3) and/or the amount of information displayed through the rollable display 241, based on the detected distance. For example, the electronic device 101 may increase the size of the rollable display 241 and increase the amount of information displayed through the rollable display 241 as a distance between the electronic device 101 and a user is close.

Referring to FIG. 18, the electronic device 101 according to an embodiment may control the rollable display 241 to have a first size S1 when a distance between the electronic device 101 and a user is greater than a first distance in a circle mode. When receiving an event through a specific application while the rollable display 241 has the first size S1, the electronic device 101 may provide only the minimum information (e.g., first information 1811) related to the event. For example, the electronic device 101 may control the rollable display 241 to display, as ambient notification, only an icon of a specific application through which an event is received. For example, the electronic device 101 may receive a message through a messenger application. The electronic device 101 may provide only an icon corresponding to the messenger application through the rollable display 241.

Referring to FIG. 19, in a circle mode, when a distance between the electronic device 101 and a user is smaller than or equal to a first distance and greater than a second distance, the electronic device 101 according to an embodiment may control the rollable display 241 to have a second size S2 greater than a first size (e.g., the first size S1 in FIG. 18) based on a result of the execution of user recognition. When receiving an event through a specific application while the rollable display 241 has the second size S2, the electronic device 101 may provide summary information (e.g., second information 1911) related to the event. For example, in the example illustrated in FIG. 19, the amount of information (e.g., the second information 1911) displayed through the rollable display 241 may be more detailed than the amount of information (e.g., the first information 1 in FIG. 18) displayed through the rollable display 241 in the example illustrated in FIG. 18. For example, the electronic device 101 may receive a message through a messenger application. The electronic device 101 may additionally provide, through the rollable display 241, information about a second user U2 who has transmitted the message.

Referring to FIG. 20, in a circle mode, when a distance between the electronic device 101 and a user is smaller than or equal to a second distance, the electronic device 101 according to an embodiment may control the rollable display 241 to have a third size S3 greater than the second size (e.g., the second size S2 in FIG. 19) or a maximum size based on a result of the execution of user recognition. When receiving an event through a specific application while the rollable display 241 has the third size or the maximum size, the electronic device 101 may provide all pieces of information (e.g., third information 2011) related to the event. For example, in the example illustrated in FIG. 20, the amount of information (e.g., the third information 2011) displayed through the rollable display 241 may be more detailed than the amount of information (e.g., the second information 1911 in FIG. 19) displayed through the rollable display 241 in the example illustrated in FIG. 19. For example, the electronic device 101 may receive a message through a messenger application. The electronic device 101 may provide, through the rollable display 241, an execution screen of the messenger application including the received message, based on user recognition.

Referring to FIG. 21, the electronic device 101 may receive a call request through a call application. The electronic device 101 may provide a user interface 2111 for a video call, an image, etc. through the rollable display 241 based on user recognition.

Figure 22:
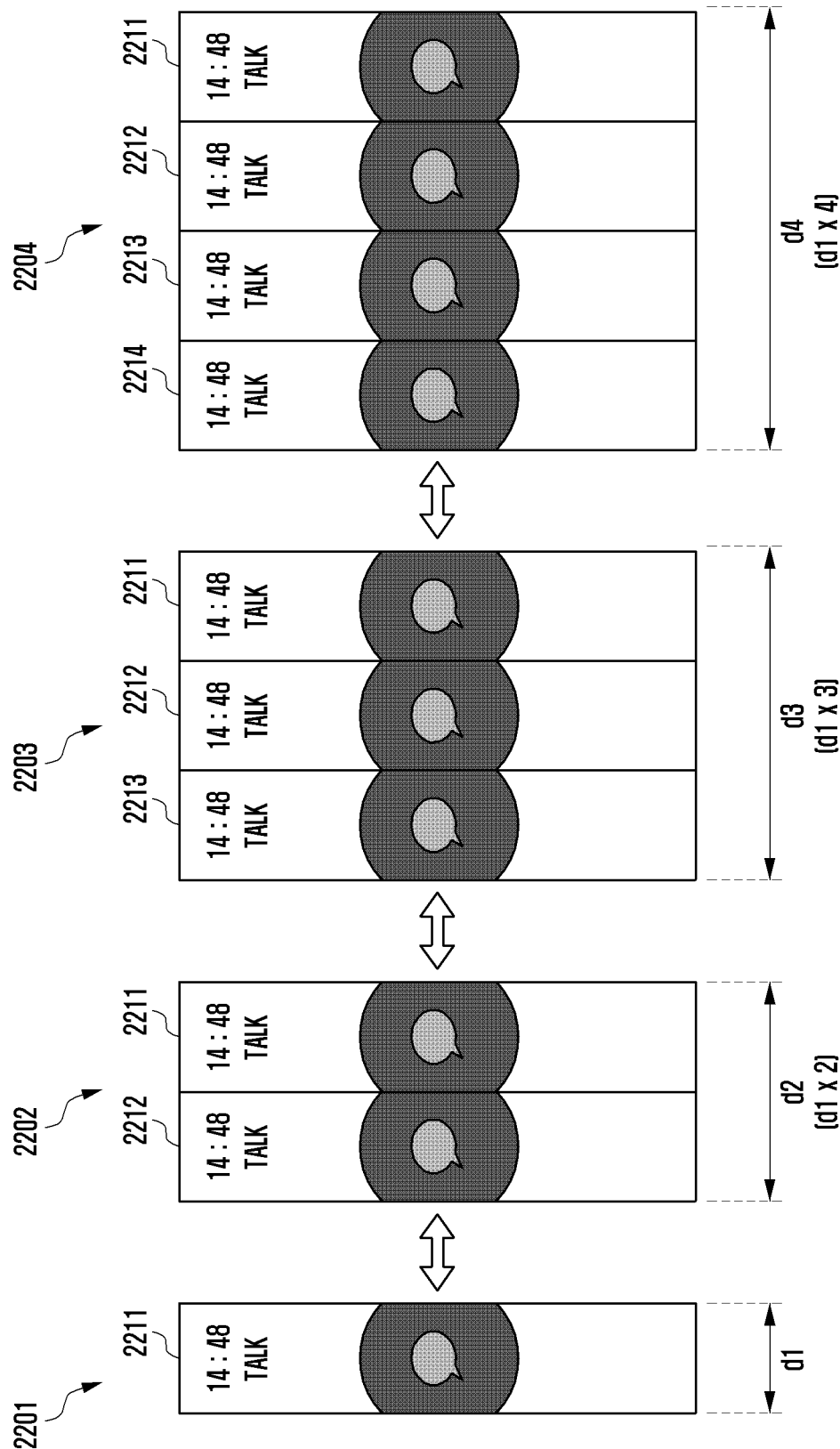
FIG. 22 is an example describing an operation of controlling, by the electronic device, the size of the rollable display based on received events being accumulated according to an embodiment of the disclosure.

FIG. 22 is an example describing an operation of controlling, by the electronic device 101, the size of the rollable display 241 based on received events being accumulated or as the amount of content to be displayed is greater than a given reference or more according to an embodiment of the disclosure.

The electronic device 101 illustrated in FIG. 22 may include an embodiment at least some of which are similar to or different from the electronic device 101 described with reference to FIGS. 2 to 21. Hereinafter, characteristics of the electronic device 101, which have not been described, are in priority described with reference to FIG. 22.

Referring to FIG. 22, in a circle mode, as the reception of events or notification 2211, 2212, 2213, and 2214 is accumulated, the electronic device 101 according to an embodiment may control the size of a rollable display 241 (e.g., the first display 241 in FIG. 3). According to an embodiment, the event or notification may include notification (or push notification) generated from at least one of a message application, a call application, and an application related to social network service (SNS). According to an embodiment, the event or notification may include notification related to a state of at least one application stored in the electronic device 101. According to an embodiment, the event or notification may include notification based on data received by the electronic device 101 from an external device (not illustrated) (e.g., a server or a wearable device) through a communication module (e.g., the communication module 190 in FIG. 1).

According to an embodiment, the electronic device 101 may increase the size of the rollable display 241 as the number of accumulated events or notification 2211, 2212, 2213, and 2214 not checked by a user is increased. Accordingly, the user may easily check whether the number of accumulated events or notification 2211, 2212, 2213, and 2214 not checked by the user is many, by checking the size of the rollable display 241 in the state in which the user is far away from the electronic device 101. For example, if a user is far away from the electronic device 101, when the size of the rollable display 241 is small, the user may recognize that not-checked events or notification 2211, 2212, 2213, and 2214 are small or not present. For example, if a user is far away from the electronic device 101, when the size of the rollable display 241 is large, the user may recognize that the number of accumulated events or notification 2211, 2212, 2213, and 2214 not checked by the user is many.

With reference to a state 2201 in FIG. 22, when the number of accumulated events or notification not checked by a user is one 2211, the electronic device 101 according to an embodiment may control the rollable display 241 to have a cylindrical shape having a first diameter "d1", and may display the event or notification not checked by the user through the rollable display 241.

With reference to a state 2202 in FIG. 22, when the number of accumulated events or notification not checked by a user is two 2211 and 2212, the electronic device 101 according to an embodiment may control the rollable display 241 to have a cylindrical shape having a second diameter "d2" greater than the first diameter "d1", and may display the events or notification not checked by the user through the rollable display 241. For example, the second diameter "d2" may have a length two times the first diameter "d1."

With reference to a state 2203 in FIG. 22, when the number of accumulated events or notification not checked by a user is three 2211, 2212, and 2213, the electronic device 101 according to an embodiment may control the rollable display 241 to have a cylindrical shape having a third diameter "d3" greater than the second diameter "d2", and may display the events or notification not checked by the user through the rollable display 241. For example, the third diameter "d3" may have a length three times the first diameter "d1."

With reference to a state 2204 in FIG. 22, when the number of accumulated events or notification not checked by a user is four 2211, 2212, 2213, and 2214, the electronic device 101 according to an embodiment may control the rollable display 241 to have a cylindrical shape having a fourth diameter "d4" greater than the third diameter "d3", and may display the events or notification not checked by the user through the rollable display 241. For example, the fourth diameter "d4" may have a length four times the first diameter "d1."

The electronic device 101 according to various embodiments may control the most recently received event or notification to be preferentially displayed when the number of accumulated events or notification not checked by a user is plural.

Figure 23:
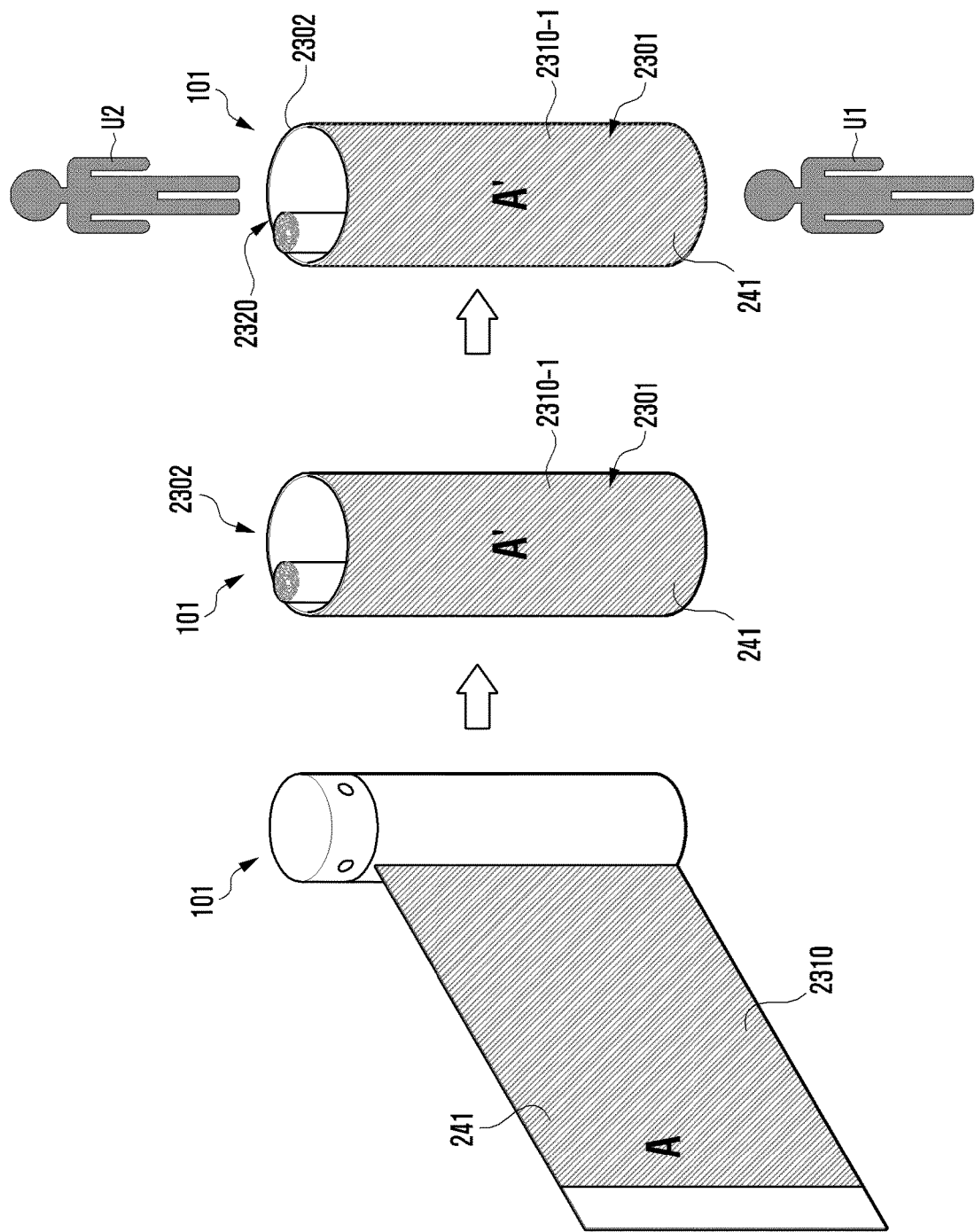
FIG. 23 is an example describing an operation of controlling, by the electronic device, a screen displayed on the rollable display when the electronic device changes from a second state to a circle mode according to an embodiment of the disclosure.

FIG. 23 is an example describing an operation of controlling, by the electronic device 101, a screen displayed through the rollable display 241 when the electronic device 101 changes from a second state to a circle mode according to an embodiment of the disclosure.

The electronic device 101 illustrated in FIG. 23 may include an embodiment at least some of which are similar to or different from the electronic device 101 described with reference to FIGS. 2 to 22. Hereinafter, characteristics of the electronic device 101, which have not been described, are in priority described with reference to FIG. 23.

Referring to FIG. 23, when changing from a second state to a circle mode, the electronic device 101 according to an embodiment may change an area of a display area in which a screen is displayed. For example, when changing a state of the electronic device 101 from a second state to a circle mode, a user who views a rollable display 241 (e.g., the first display 241 in FIG. 3) of the electronic device 101 in a specific direction may view only a portion corresponding to half of a display area of the rollable display 241. Accordingly, when the second state is changed into the circle mode while an execution screen 2310 of an application A is displayed through the entire portion of the display area, the electronic device 101 according to an embodiment may display an execution screen 2310-1 of the application A whose size and resolution have been adjusted, through a first half area 2301 corresponding to half of a display area toward the user.

While displaying the changed execution screen 2310-1 of the application A through the first half area 2301, the electronic device 101 according to an embodiment may make off or deactivate a second half area 2302 disposed on a side opposite to the first half area 2301. By making off or deactivating the second half area 2302, the electronic device 101 according to an embodiment can prevent the display of unnecessary information through the second half area 2302, can reduce power consumption, and can reduce a malfunction of the electronic device 101 attributable to a touch miss-input unwanted by a user. In various embodiments of this document, the second half area 2302 may include the remaining area of the display area of the rollable display 241 except the first half area 2301.

If users are located in both directions, respectively, from the electronic device 101, the electronic device 101 according to an embodiment may control a screen 2320 to be viewed by a second user U2 through the second half area 2302 based on authority authentication of a first user U1 who controls the first half area 2301. According to various embodiments, the screen 2320 provided to the second user U2 through the second half area 2302 may be the same screen as the screen 2310-1 displayed through the first half area 2301 or may be the execution screen 2310-1 of another application configured by the first user U1. According to various embodiments, a screen provided to the second user U2 through the second half area 2302 may be configured so that the second user U2 controls the entire or a part of the second half area 2302 based on rights assigned from the first user U1 to the second user U2. For example, the second user U2 may control the entire information or only some information of a screen displayed through the second half area 2302 based on rights assigned by the first user U1.

FIG. 24 is an example describing an operation of correcting, by the electronic device 101, the distortion of a screen displayed through the rollable display 241 based on a visual axis of a user being detected according to an embodiment of the disclosure.

FIG. 25 is another example describing an operation of correcting, by the electronic device 101, the distortion of a screen displayed through the rollable display 241 based on a visual axis of a user being detected according to an embodiment of the disclosure.

The electronic device 101 illustrated in FIGS. 24 and 25 may include an embodiment at least some of which are similar to or different from the electronic device 101 described with reference to FIGS. 2 to 23. Hereinafter, characteristics of the electronic device 101, which have not been described, are in priority described with reference to FIGS. 24 and 25.

Referring to FIGS. 24 and 25, the electronic device 101 according to an embodiment may detect a visual axis of a user through the camera module 180. According to an embodiment, in a circle mode, the electronic device 101 may correct the distortion of a screen SC displayed through the rollable display 241 depending on whether a visual axis of a user is toward a front direction of a rollable display 241 (e.g., the first display 241 in FIG. 3).

According to an embodiment, when the electronic device 101 is in a circle mode, a display area of the rollable display 241 may have a cylindrical shape. Accordingly, some image SC1 or SC2 of the screen SC displayed through the rollable display 241 may be viewed as being distorted by a user depending on a location and angle of a visual axis of the user. For example, as illustrated in FIG. 24, when a visual axis 2401 of a user is disposed in front of a display area, the some image SC1 of the screen SC corresponding to an eyeline 2402 located at a place higher than the visual axis may be viewed as being downward bent, and the some image SC2 of the screen SC corresponding to an eyeline 2403 located at a place lower than the visual axis may be viewed as being upward bent.

According to an embodiment, when the visual axis 2401 of a user is disposed in front of a display area of the rollable display 241 as illustrated in FIG. 24, the electronic device 101 may convert the some image SC1 of the screen SC corresponding to the eyeline 2402 located at a place higher than the visual axis so that the some image SC1 is upward bent and convert the some image SC2 of the screen SC corresponding to an eyeline 2403 located at a place lower than the visual axis so that the some image SC2 is downward bent, in order to reduce a distortion phenomenon. According to an embodiment, in a circle mode, the electronic device 101 may identify a location of an eye of a user and curvature of the rollable display 241, may calculate a degree of the distortion of the some images SC1 and SC2 of the screen SC according to the identified location of the eye and the identified curvature, may convert an image in a direction opposite to a direction in which a distortion phenomenon occurs, and may display the image. According to an embodiment, the electronic device 101 may adjust the height of the some images SC1 and SC2 of the displayed screen SC to a center line CL of the some images SC1 and SC2 of the screen SC, and may determine a degree of the inclination of conversion of the some images SC1 and SC2 of the screen SC by using an interpolation method in which curvature has been considered based on a degree of distortion compensations.

Referring to FIG. 25, when a visual axis 2501 of a user is located on an upper side from a display area, some image SC1 of a screen SC corresponding to an eyeline 2502 located at a place higher than the visual axis may be viewed as being upward bent, and some image SC2 of the screen SC corresponding to an eyeline 2503 located at a place lower than the visual axis may be viewed as being further upward bent. According to an embodiment, when the visual axis 2501 of a user is located on an upper side from a display area of the rollable display 241 as illustrated in FIG. 25, the electronic device 101 may convert the some image SC1 of the screen SC corresponding to the eyeline 2502 located at a place higher than the visual axis so that the some image SC1 is downward bent by a first compensation value and convert the some image SC2 of the screen SC corresponding to the eyeline 2503 located at a place lower than the visual axis so that the some image SC2 is further downward bent by a second compensation value greater than the first compensation value, in order to reduce a distortion phenomenon.

Figure 26:
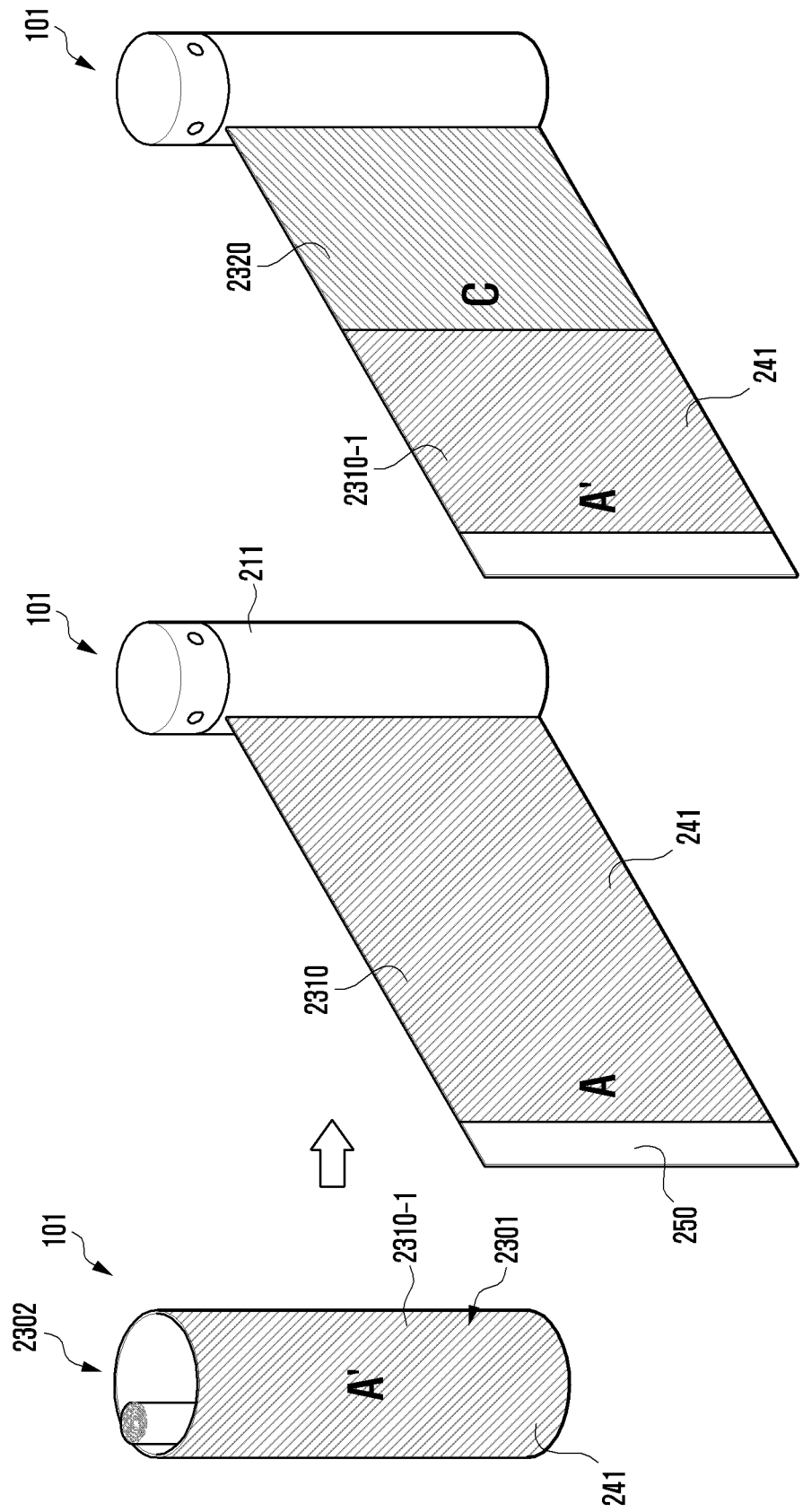
FIG. 26 is an example describing an operation of controlling, by the electronic device, a screen displayed on the rollable display when the electronic device changes from a circle mode to a second state according to an embodiment of the disclosure.

FIG. 26 is an example describing an operation of controlling, by the electronic device 101, a screen displayed through the rollable display 241 when the electronic device 101 changes from a circle mode to a second state according to an embodiment of the disclosure.

Figure 27:
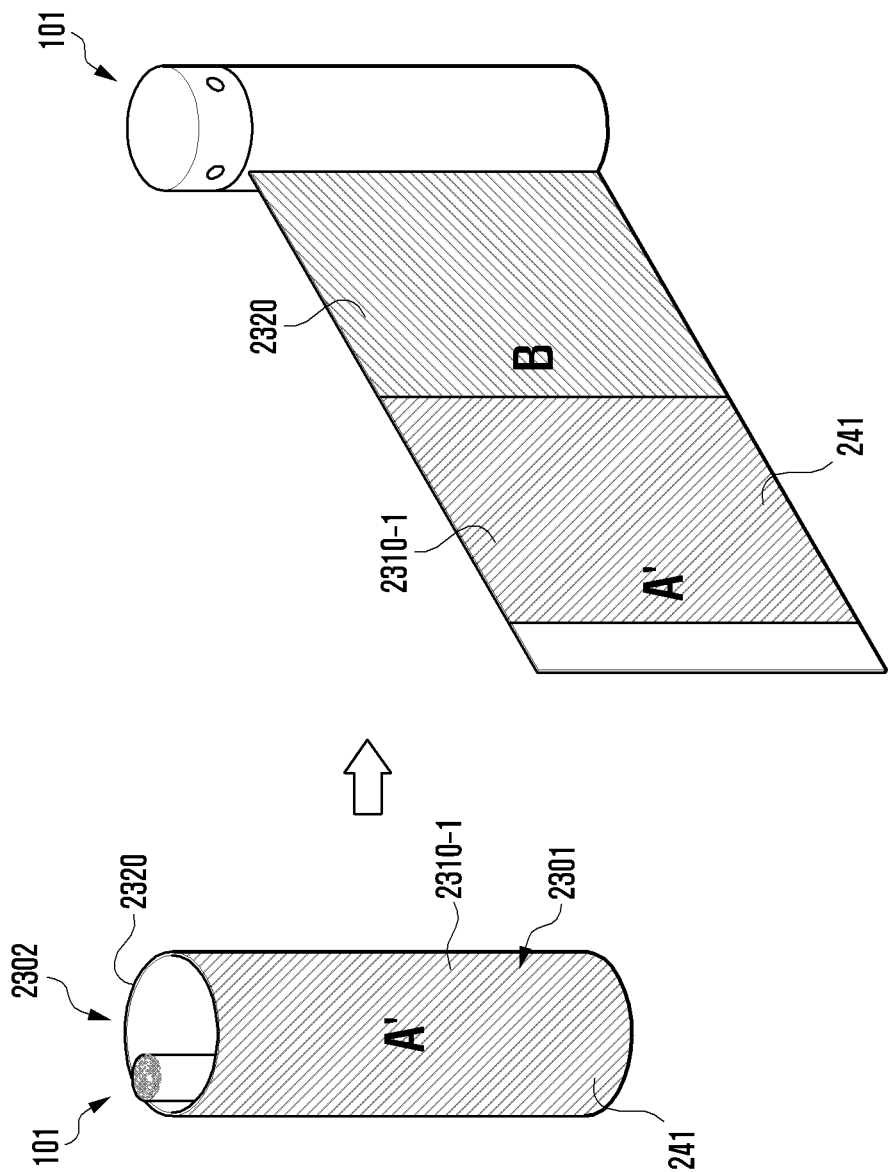
FIG. 27 is an example describing an operation of controlling, by the electronic device, a screen displayed on the rollable display when the electronic device changes from a circle mode to a second state according to an embodiment of the disclosure.

FIG. 27 is an example describing an operation of controlling, by the electronic device 101, a screen displayed through the rollable display 241 when the electronic device 101 changes from a circle mode to a second state according to an embodiment of the disclosure.

The electronic device 101 illustrated in FIGS. 26 and 27 may include an embodiment at least some of which are similar to or different from the electronic device 101 described with reference to FIGS. 2 to 25. Hereinafter, characteristics of the electronic device 101, which have not been described, are in priority described with reference to FIGS. 26 and 27.

Referring to FIGS. 26 and 27, when changing from a circle mode to a second state, the electronic device 101 according to an embodiment may change a screen depending on whether the screen is being displayed through the second half area 2302.

Referring to FIG. 26, when changing from a circle mode to a second state, the electronic device 101 according to an embodiment may not display a screen through the second half area 2302 and may be displaying the screen 2310-1 only through the first half area 2301. For example, the electronic device 101 may change its state into a second state, in the state in which the electronic device 101 controls a rollable display 241 (e.g., the first display 241 in FIG. 3) in a circle mode, does not display a screen through the second half area 2302, and displays the screen 2310-1 only through the first half area 2301. For example, the electronic device 101 may change from a circle mode to a second state in response to the detection of the handler member 250 being detached from the side part 211 of the housing 200. According to an embodiment, when the electronic device 101 changes from a circle mode to a second state, if a previous state is a state in which a screen is not displayed through the second half area 2302 and the screen 2310-1 is displayed only through the first half area 2301, the electronic device 101 may double the size of the screen 2310-1 being displayed through the first half area 2301, and may display the increased screen 2310 through the entire display area of the rollable display 241. For example, the electronic device 101 may increase, to a double size, the execution screen 2310-1 of the application A being displayed through the first half area 2301, and may display the increased execution screen 2310-1 through the entire area of the rollable display 241.

According to an embodiment, when changing from a circle mode to a second state, the electronic device 101 may maintain the screen 2310-1 displayed through the first half area 2301, may activate the second half area 2302 that was in an off state, and may display the execution screen 2320 of another application, a screen 2320 of a recently executed application, or a multi-window 2320 through the activated second half area 2302.

Referring to FIG. 27, when the electronic device 101 changes from a circle mode to a second state, if a previous state is a state in which the first screen 2310-1 is displayed through the first half area 2301 and the second screen 2320 is displayed through the second half area 2302, the electronic device 101 according to an embodiment may continuously display the first screen 2310-1 and the second screen 2320 in the second state of the electronic device 101.

Figure 28:
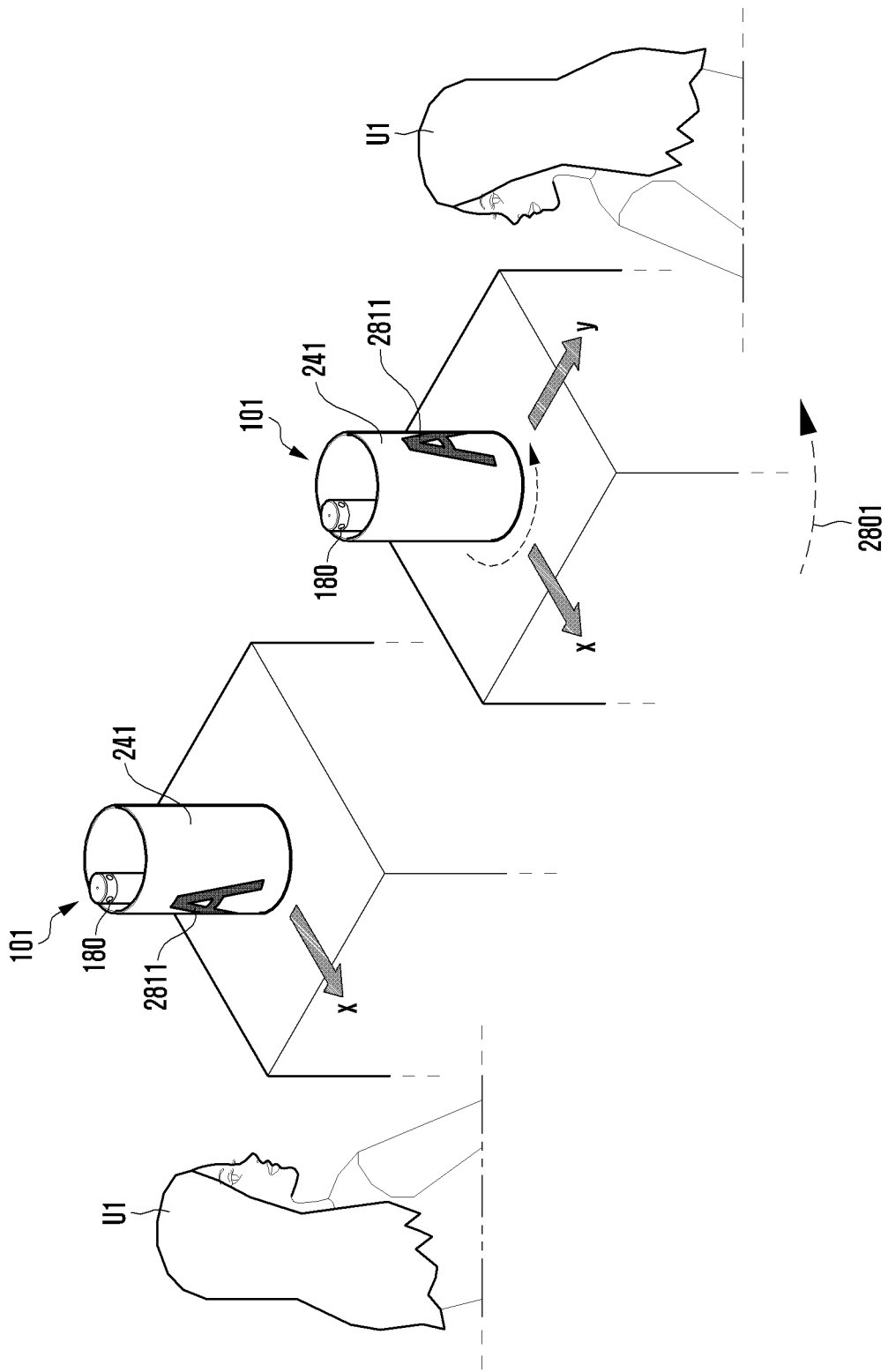
FIG. 28 is an example describing an operation of controlling, by the electronic device, a screen displayed on the rollable display based on a movement of a user according to an embodiment of the disclosure.

FIG. 28 is an example describing an operation of controlling, by the electronic device 101, a screen displayed through the rollable display 241 based on a movement of a user according to an embodiment of the disclosure.

The electronic device 101 illustrated in FIG. 28 may include an embodiment at least some of which are similar to or different from the electronic device 101 described with reference to FIGS. 2 to 27. Hereinafter, characteristics of the electronic device 101, which have not been described, are in priority described with reference to FIG. 28.

Referring to FIG. 28, the electronic device 101 according to an embodiment may dynamically track a location of a user U1 and/or a movement of the user U1 through a camera module 180 (e.g., the camera module 180 in FIG. 1) capable of photographing in a 360-degree direction from the electronic device 101. The electronic device 101 according to an embodiment may include a microphone (not illustrated) as a part of an input module (e.g., the input module 150 in FIG. 1), and may recognize the user U1 based on a voice of the user U1 obtained through the microphone. According to an embodiment, after the recognition of the user U1 is completed, the electronic device 101 may dynamically track a location of the user U1 and/or a movement of the user U1 by tracking (or beam-forming) a voice of the user U1 obtained through the microphone. According to an embodiment, the electronic device 101 may dynamically track a location of the user U1 and/or a movement of the user U1 based on at least one of a voice of the user U1 obtained through the microphone or an image corresponding to at least a part of the body of the user U1 obtained through the camera module 180.

According to an embodiment, in a circle mode, the electronic device 101 may dynamically track a location of the user U1 and/or a movement of the user U1, and may move, in a direction in which the user U1 is located, a screen 2811 now being displayed. For example, the electronic device 101 may detect that the user U1 moves (2801) in a y direction of the electronic device 101 in the state in which the screen 2811 is displayed in an x direction from the electronic device 101, and may change a direction in which the screen 2811 is outputted from the x direction to the y direction in response to the movement 2801 being detected. For example, the electronic device 101 may continuously change the direction in which the screen is outputted based on a movement of the user U1.

According to an embodiment, when the user U1 is located within a view angle area of the camera module 180, the electronic device 101 may change a direction in which the screen 2 is outputted into a direction in which the user U1 is located, based on a movement of the user U1 being dynamically tracked using the camera module 180.

According to an embodiment, when the user U1 whose voice has been recognized is located around the electronic device 101, the electronic device 101 may change a direction in which the screen 2 is outputted into a direction in which the user U1 is located, based on a voice of the user U1 being tracked (or beam-foamed), which is obtained through a microphone.

Figure 29:
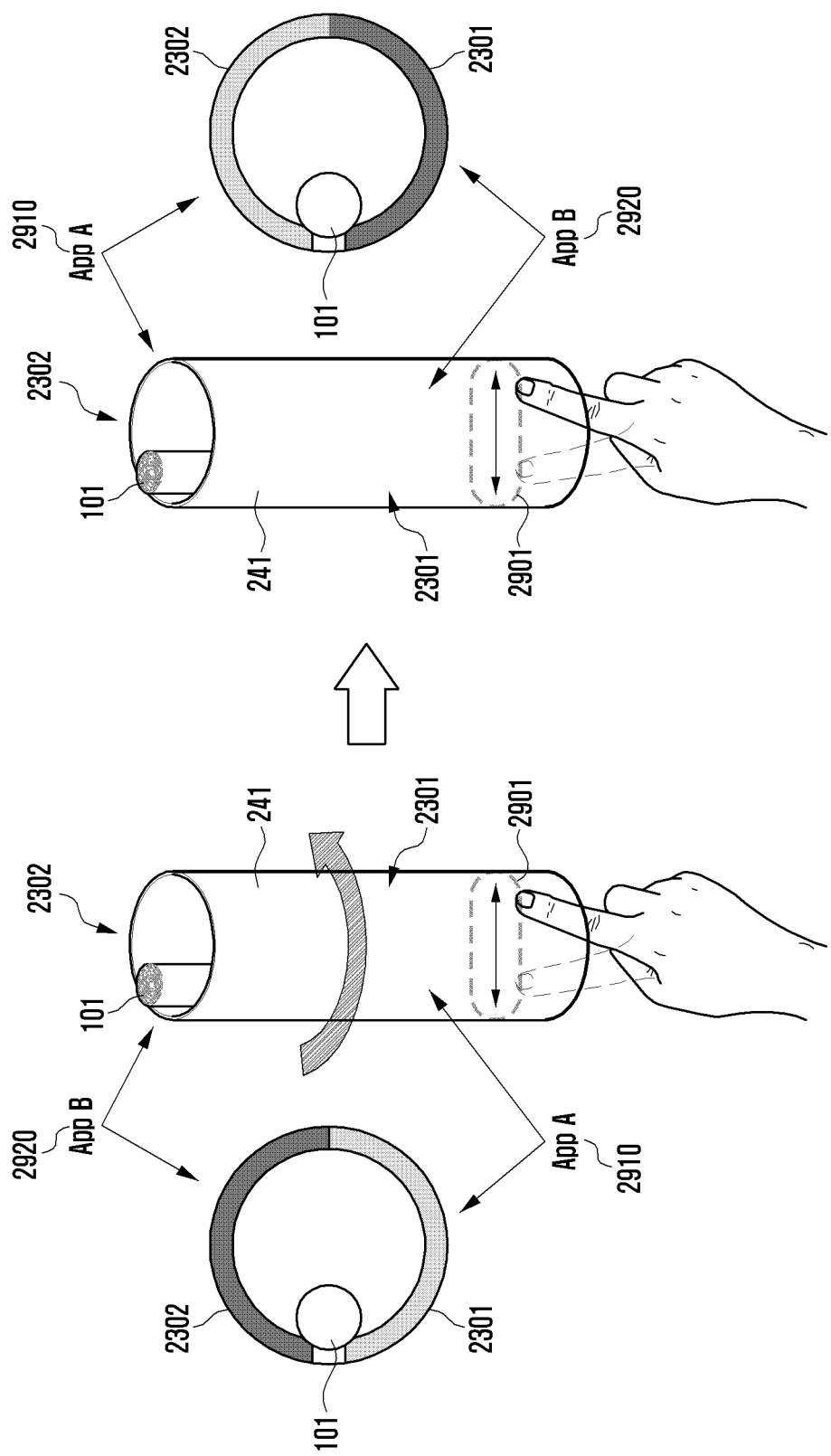
FIG. 29 is an example describing an operation of changing, by the electronic device, a screen displayed on the rollable display based on a user input received in a circle mode according to an embodiment of the disclosure.

FIG. 29 is an example describing an operation of changing, by the electronic device 101, a screen displayed through the rollable display 241 based on a user input received in a circle mode according to an embodiment of the disclosure.

Figure 30:
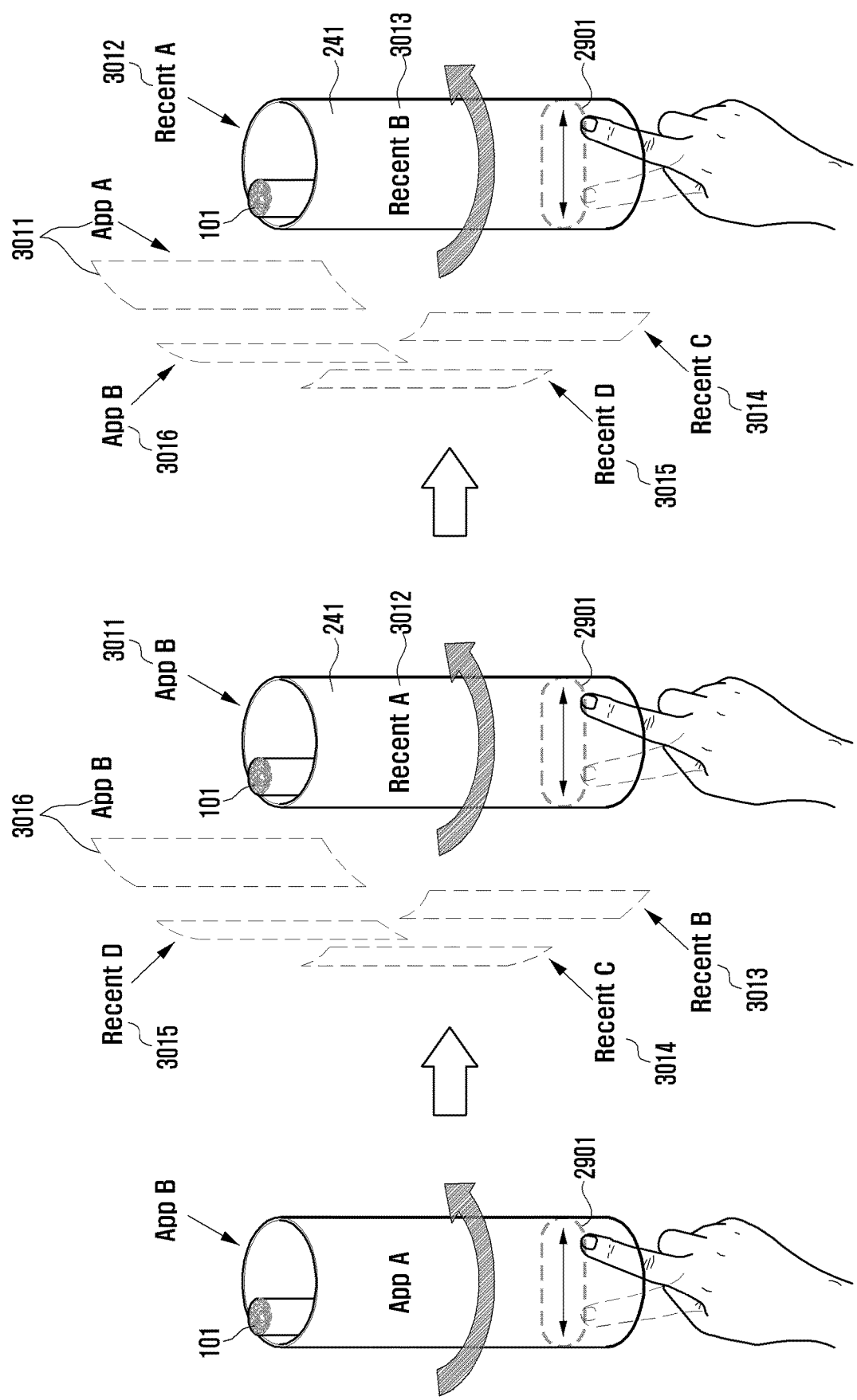
FIG. 30 is an example describing an operation of changing, by the electronic device, a screen displayed on the rollable display based on a user input received in a circle mode according to an embodiment of the disclosure.

FIG. 30 is an example describing an operation of changing, by the electronic device 101, a screen displayed through the rollable display 241 based on a user input received in a circle mode according to an embodiment of the disclosure.

The electronic device 101 illustrated in FIGS. 29 and 30 may include an embodiment at least some of which are similar to or different from the electronic device 101 described with reference to FIGS. 2 to 28. Hereinafter, characteristics of the electronic device 101, which have not been described, are in priority described with reference to FIGS. 29 and 30.

Referring to FIG. 29, in a circle mode, the electronic device 101 according to an embodiment may receive a user input 2901 through a rollable display 241 (e.g., the first display 241 in FIG. 3). According to an embodiment, the user input 2901 may include a touch input 2901 (or a touch gesture input) of a user for the rollable display 241 or a hovering input (or a hovering gesture input) of a user for the rollable display 241. In the following description, the touch input 2901 is mentioned as an example of the user input 2901, but various embodiments of this document may be changed without being limited thereto.

Referring to FIG. 29, the electronic device 101 according to an embodiment may receive the touch input 2901 in the state in which a first screen 2910 is displayed through the first half area 2301 and a second screen 2920 is displayed through the second half area 2302 in a circle mode. For example, the electronic device 101 may receive the touch input 2901 of a user that swipes the first screen 2910. According to an embodiment, the electronic device 101 may change a screen outputted through the first half area 2301 from the first screen 2910 to the second screen 2920 in response to the touch input 2901. According to an embodiment, in changing the screen outputted through the first half area 2301, the electronic device 101 may rotate only at least some content of a current screen along a cylindrical surface formed by the rollable display 241. According to an embodiment, when the user input 2901 through the first half area 2301 is repeated, the electronic device 101 may continuously rotate only at least some content of a current screen along the cylindrical surface formed by the rollable display 241.

According to an embodiment, in a circle mode, the number of execution screens of an application or user interfaces rotating along a cylindrical surface formed by the rollable display 241 based on the user input 2901 may be determined based on the number of users located around the electronic device 101. For example, when two users are located around the electronic device 101, the electronic device 101 may divide the rollable display 241 into two areas (e.g., the first half area 2301 and the second half area 2302), and may set the number of execution screens of an application or user interfaces rotating along a cylindrical surface to two which are the same or different from each other. For example, when three users are present around the electronic device 101, the electronic device 101 may divide the rollable display 241 into three areas (e.g., a first sub-area, a second sub-area, and a third sub-area), and may set the number of execution screens of an application or user interfaces rotating along a cylindrical surface to three which are the same or different from one another.

Referring to FIG. 30, in a circle mode, the electronic device 101 according to another embodiment may display an execution screen of an application or a user interface by rotating the execution screen or the user interface along a cylindrical surface formed by the rollable display 241 whenever the electronic device 101 receives the touch input 2901 through the rollable display 241. In another embodiment, an execution screen of an application or a user interface rotating along a cylindrical surface formed by the rollable display 241 may be repeatedly circulated by a designated number set by a user. For example, assuming that an execution screen of an application or a user interface rotationally displayed based on the repetitive touch input 2901 of a user includes screens a screen A 3011, a screen B 3012, a screen C 3013, a screen D 3014, a screen E 3015, and a screen F 3016, these screens may be rotationally displayed through the first half area 2301 based on the repetitive touch input 2901 of the user. For example, a screen displayed through the first half area 2301 may be changed in order of the screen A 3011, the screen B 3012, the screen C 3013, the screen D 3014, the screen E 3015, and the screen F 3016 based on the repetitive touch input 2901 of a user. When the touch input 2901 of the user occurs in the state in which the screen F 3016 is displayed, the screen F 3016 may change into the screen A 3011 again. According to an embodiment, when the touch input 2901 of a user occurs, the electronic device 101 may control the rollable display 241 so that a screen previously displayed in the first half area 2301 is displayed in the second half area 2302.

Figure 31:
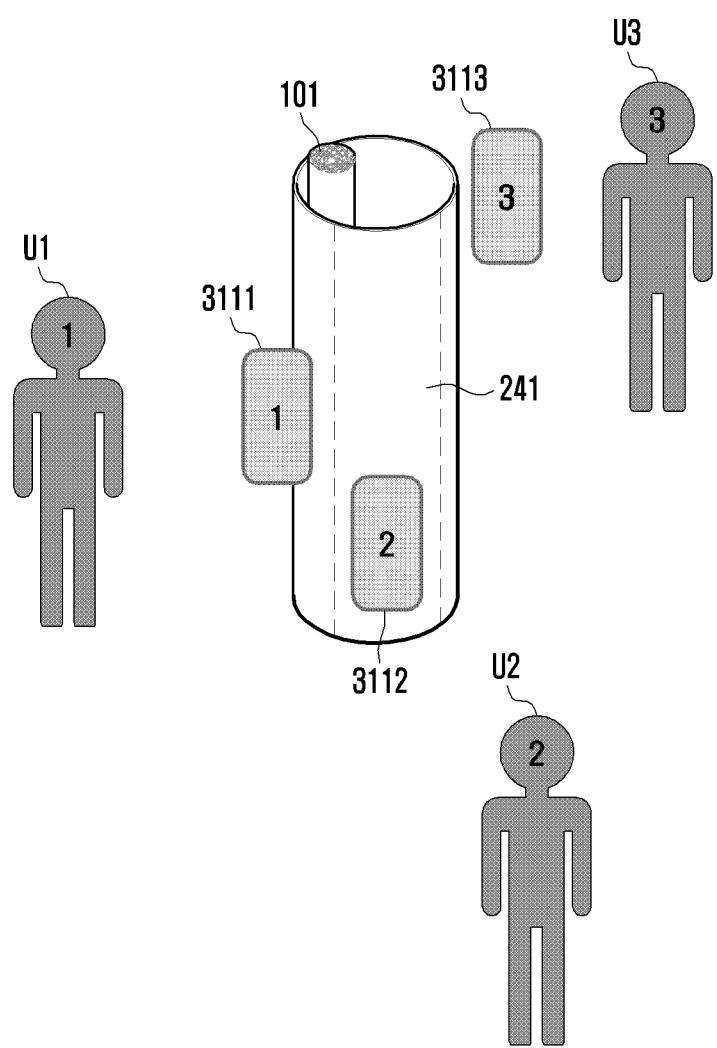
FIG. 31 is an example describing an operation of providing, by the electronic device, a plurality of screens through the rollable display based on a plurality of users around the electronic device being detected in a circle mode according to an embodiment of the disclosure.

FIG. 31 is an example describing an operation of providing, by the electronic device 101, a plurality of screens through the rollable display 241 based on a plurality of users around the electronic device 101 being detected in a circle mode according to an embodiment of the disclosure.

The electronic device 101 illustrated in FIG. 31 may include an embodiment at least some of which are similar to or different from the electronic device 101 described with reference to FIGS. 2 to 30. Hereinafter, characteristics of the electronic device 101, which have not been described, are in priority described with reference to FIG. 31.

Referring to FIG. 31, the electronic device 101 according to an embodiment may provide a plurality of screens through a rollable display 241 (e.g., the first display 241 in FIG. 3) based on a plurality of users around the electronic device 101 being detected in a circle mode. According to an embodiment, the electronic device 101 may divide a screen of the rollable display 241 into N screens (e.g., 3111, 3112, and 3113) based on the number of users (e.g., N persons), and may provide independent usability for each of the divided N screens (e.g., 3111, 3112, and 3113). To this end, the electronic device 101 may recognize the number of users (e.g., U1, U2, and U3) located around the electronic device 101 by using a camera module (not illustrated) (e.g., the camera module 180 in FIG. 1) or a microphone (not illustrated), and may perform the recognition of each of the users (e.g., U1, U2, and U3). According to an embodiment, when detecting a plurality of users (e.g., U1, U2, and U3) around the electronic device 101, the electronic device 101 may identify a main user (e.g., the first user U1) among the plurality of users (e.g., U1, U2, and U3). According to an embodiment, the electronic device 101 may provide independent usability for each of the divided N screens (e.g., 3111, 3112, and 3113) based on a user input received from the identified main user (e.g., the first user U1), and may set rights by which other users (e.g., the second user U2 and the third user U3) provided with the respective divided screens (e.g., 3111, 3112, and 3113) can control the divided screens (e.g., 3112 and 3113) assigned thereto. According to an embodiment, the electronic device 101 may perform a configuration based on a user input received from a main user (e.g., the first user U1) so that a specific user (e.g., the second user U2) can control at least a part of a divided screen (e.g., the second screen 3112) outputted toward the specific user (e.g., the second user U2). For example, a specific user (e.g., the second user U2) may control at least a part of a divided screen (e.g., the second screen 3112) outputted toward the specific user (e.g., the second user U2) through a touch input based on rights assigned by a main user (e.g., the first user U1). According to an embodiment, the electronic device 101 may perform a configuration based on a user input received from a main user (e.g., the first user U1) so that a specific user (e.g., the second user U2) cannot control a screen (e.g., the second screen 3112) outputted toward the specific user (e.g., the second user U2). For example, a specific user (e.g., the second user U2) may not control a divided screen (e.g., the second screen 3112) outputted toward the specific user (e.g., the second user U2) because his or her rights from a main user (e.g., the first user U1) are limited.

Figure 32:
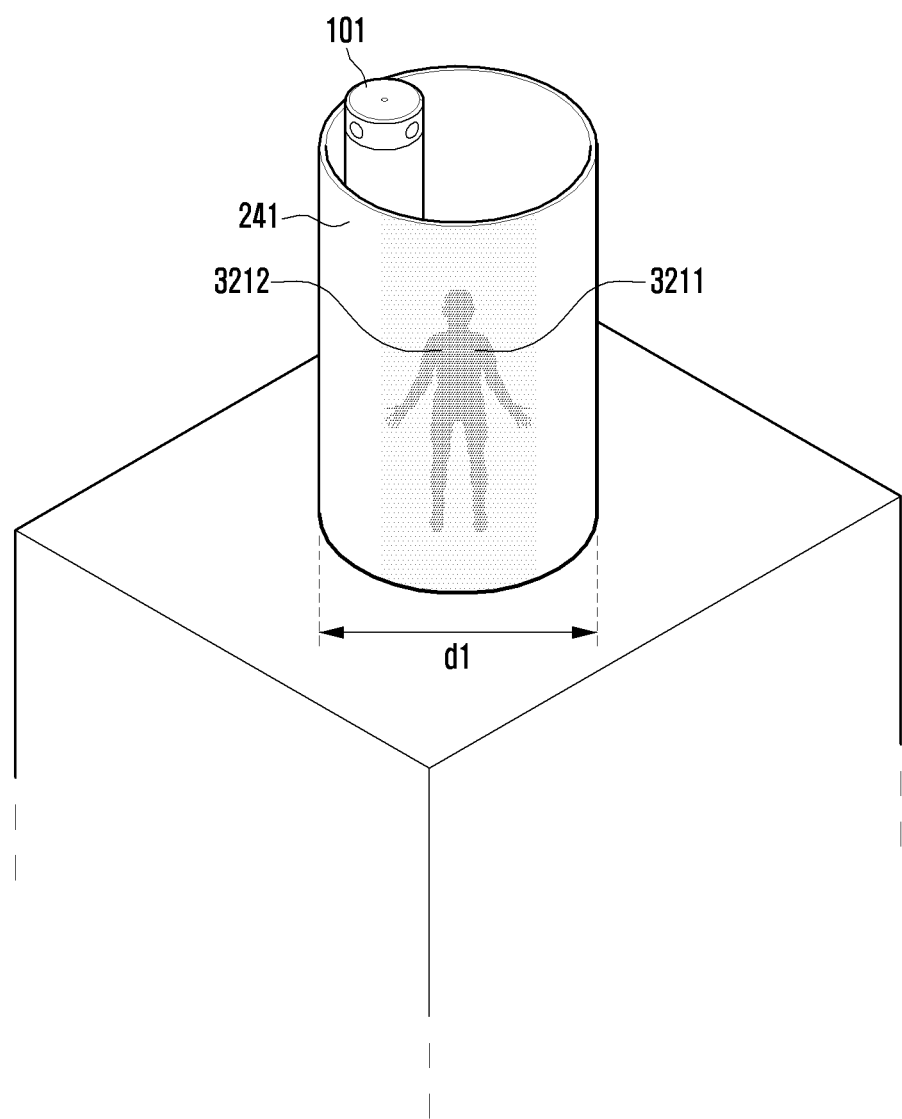
FIG. 32 is an example describing an operation of providing, by the electronic device, a hologram effect in a circle mode according to an embodiment of the disclosure.

FIG. 32 is an example describing an operation of providing, by the electronic device 101, a hologram effect in a circle mode according to an embodiment of the disclosure.

The electronic device 101 illustrated in FIG. 32 may include an embodiment at least some of which are similar to or different from the electronic device 101 described with reference to FIGS. 2 to 31. Hereinafter, characteristics of the electronic device 101, which have not been described, are in priority described with reference to FIG. 32.

According to an embodiment, in a circle mode, the electronic device 101 may apply a hologram effect to some objects 3211 displayed through the rollable display 241 as a rollable display 241 (e.g., the first display 241 in FIG. 3) is disposed in a cylindrical shape. According to an embodiment, the electronic device 101 may detect a designated object 3211 (e.g., a person or a specific thing) from a screen to be displayed through the rollable display 241, and may apply a hologram effect to the designated object 3211. According to an embodiment, in order to display the designated object 3211 in a hologram shape, the electronic device 101 may identify the size of a hologram subject 3212 based on the diameter "d1" of the rollable display 241 according to a circle mode.

According to an embodiment, in order to provide a hologram effect to a user, the electronic device 101 may identify one object to be displayed through a display area of a rollable display. When identifying the one object, the electronic device 101 may divide the display area of the rollable display 241 into a plurality of sub-areas. The plurality of sub-areas may have different directions in which screens are displayed. For example, the plurality of sub-areas may include a first sub-area, a second sub-area, and a third sub-area. The first sub-area may be disposed to be directed toward a first direction from the electronic device 101. The second sub-area may be disposed to be directed toward a second direction from the electronic device 101. The third sub-area may be disposed to be directed toward a third direction from the electronic device 101. The first direction, the second direction, and the third direction may be different directions. The electronic device 101 according to an embodiment can provide a user with a hologram effect for one object in a way that the one object is displayed at various points in time with respect to the user by controlling the rollable display 241 so that one identified object is displayed in each of the plurality of sub-areas.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. An electronic device comprising:
a housing comprising:
a main body,
a first planar part disposed at a first end of the main body, and
a second planar part disposed at a second end of the main body and being parallel to the first planar part;
a motor disposed in an interior of the housing;
a rollable display configured to be drawn out from or inserted into the interior of the housing through a slit of the main body formed in a direction perpendicular to the first planar part, by using the motor;
a handler member combined with a first end of the rollable display and comprising at least one first magnet;
a hall sensor area disposed on a side part of the main body in the direction perpendicular to the first planar part, the hall sensor area including at least one sensor;
at least one second magnet disposed in the hall sensor area; and
a processor,
wherein a second end of the rollable display is fixed to the housing based on the handler member being attached to the hall sensor area by magnetism between the at least one first magnet and the at least one second magnet in a state in which at least a part of the rollable display has been drawn out from the interior of the housing and at least a part of the side part of the main body is wound,
wherein a size of a displaying area of the rollable display is changeable by drawing out or inserting a part of the rollable display through the slit in the state in which the second end of the rollable display is fixed to the housing, and
wherein the processor is configured to:
based on the at least one sensor detecting that handler member is attached to the hall sensor area, control the rollable display in a circle mode,
identify an amount of information displayed through the rollable display in the circle mode, and
based on the identified amount of information, control the motor to draw out or insert the part of the rollable display through the slit.

2. The electronic device of claim 1,
wherein at least one camera circuitry is disposed in a part of the housing and configured to photograph in a 360-degree direction from the electronic device, and
wherein the processor is further configured to:
detect a location of a user and a movement of the user by using the camera circuitry.

3. The electronic device of claim 2, wherein the processor is further configured to:
while controlling the rollable display in the circle mode, check a number of users located around the electronic device;
based on the number of users located around the electronic device, divide a display area of the rollable display into a plurality of division areas, a number of the plurality of division areas corresponding to the number of users; and
control the plurality of division areas to display different screens.

4. The electronic device of claim 2, wherein the processor is further configured to:
while controlling the rollable display in the circle mode, dynamically track the movement of the user located around the electronic device by using the camera circuitry or a microphone,
detect the movement of the user in a y direction of the electronic device in a state in which the electronic device displays a screen in an x direction of the electronic device, and
in response to detecting the movement of the user, change a direction in which the screen is being output from the x direction to the y direction.

5. The electronic device of claim 2, wherein the processor is further configured to:
based on at least one of a voice of the user obtained through a microphone or an image comprising a part of a body of the user obtained through the camera circuitry, dynamically track the movement of the user.

6. The electronic device of claim 1, further comprising:
a speaker configured to output a sound through the side part,
wherein the speaker is further configured to, while the rollable display is controlled in the circle mode, output the sound to an internal space formed as the rollable display winds the side part.

7. The electronic device of claim 6, further comprising:
a holder comprising a seated surface on which the first planar part or the second planar part is seated as the holder for holding the electronic device,
wherein the holder further comprises a sound member configured to receive the sound output from the speaker and to output the received sound in a lateral direction of the holder.

8. The electronic device of claim 7, wherein, as at least part of the sound member, the holder further comprises:
at least one upper hole disposed on the seated surface;
at least one side hole disposed on a side of the holder; and
at least one duct line interconnecting the at least one upper hole and the at least one side hole.

9. The electronic device of claim 8,
wherein the at least one upper hole comprises a first upper hole disposed in a +x direction, a second upper hole disposed in a −x direction, a third upper hole disposed in a +z direction, and a fourth upper hole disposed in a −z direction when the seated surface is viewed from a top,
wherein the at least one side hole comprises a first side hole disposed in the +x direction, a second side hole disposed in the −x direction, a third side hole disposed in the +z direction, and a fourth side hole disposed in the −z direction when the seated surface is viewed from the top, and
wherein the at least one duct line comprise a first duct line connecting the first upper hole and the first side hole, a second duct line connecting the second upper hole and the second side hole, a third duct line connecting the third upper hole and the third side hole, and a fourth duct line connecting the fourth upper hole and the fourth side hole.

10. The electronic device of claim 9,
wherein the holder further comprises an amplifier configured to amplify or attenuate sound introduced into each of the first duct line, the second duct line, the third duct line, and the fourth duct line to output the sound only in a specific direction from the holder, and
wherein the holder drives the amplifier based on control of the electronic device.

11. The electronic device of claim 1, wherein the processor is further configured to:
while controlling the rollable display in the circle mode and, in response to the rollable display winding the side part, display a first screen through a first half area which is a part of a display area of the rollable display;
display a second screen through a second half area of the display area except the first half area; and
based on a touch input of a user through the first half area, change a screen displayed through the first half area from the first screen to the second screen and change a screen displayed through the second half area from the second screen to the first screen.

12. The electronic device of claim 11, wherein the processor is further configured to:
while controlling the rollable display in the circle mode, detect a number of users located around the electronic device;
divide the display area by a number corresponding to the number of users located around the electronic device to obtain display areas; and
control the display areas to display independent screens.

13. The electronic device of claim 11,
wherein the processor is further configured to:
while controlling the rollable display in the circle mode and, in response to receiving a touch input of the user through the first half area, change the screen displayed through the first half area into another screen, and
wherein the changed screen is rotationally repeated based on a plurality of pre-configured screens receiving the touch input.

14. The electronic device of claim 13, wherein the processor is further configured to:
while controlling the rollable display in the circle mode and, in response to changing the screen displayed through the first half area, control the rollable display to display a screen previously displayed in the first half area in the second half area.

15. The electronic device of claim 1, wherein the processor is further configured to:
while controlling the rollable display in the circle mode and, in response to the rollable display winding the side part, identify one object to be displayed through a display area of the rollable display; and
provide a user with a hologram effect for the one object by dividing the display area into a plurality of sub-display areas and controlling the rollable display to display the one object in each of the plurality of sub-display areas.

16. The electronic device of claim 1, wherein the processor is further configured to:
while controlling the rollable display in the circle mode, receive an event related to at least one application stored in a memory of the electronic device;
based on the event being received, control the rollable display to display content related to the event; and
based on an amount of the content being displayed, change a diameter of the rollable display surrounding the side part of the main body.

17. The electronic device of claim 1, wherein the processor is further configured to:
while controlling the rollable display in the circle mode, receive at least one event related to at least one application stored in a memory of the electronic device; and
control the rollable display so that a most-recently received not-checked event among the at least one event is preferentially displayed.

18. The electronic device of claim 1, wherein the second end of the rollable display is connected to a rotation shaft disposed in an internal space of the housing.

19. The electronic device of claim 18, wherein the rollable display is drawn out from the interior of the housing or inserted into the interior of the housing according to a rotation of the rotation shaft.

20. The electronic device of claim 1, wherein the rollable display is drawn out from the interior of the housing by a designated second length in a second direction through the slit having a first fixed length in a first direction.

21. The electronic device of claim 20, wherein, in a drawn-out state, a display area of the rollable display comprises a transverse width corresponding to the designated second length and a longitudinal width corresponding to the first fixed length.

* * * * *